(12) United States Patent
Liu

(10) Patent No.: US 10,700,844 B2
(45) Date of Patent: Jun. 30, 2020

(54) COMMUNICATIONS APPARATUS AND UPLINK REFERENCE SIGNAL COMMUNICATION METHOD

(71) Applicant: Huawei Technologies Co., Ltd., Shenzhen (CN)

(72) Inventor: Jianqin Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 181 days.

(21) Appl. No.: 15/679,951

(22) Filed: Aug. 17, 2017

(65) Prior Publication Data

US 2017/0346615 A1 Nov. 30, 2017

Related U.S. Application Data

(63) Continuation of application No. PCT/CN2015/073216, filed on Feb. 17, 2015.

(51) Int. Cl.
*H04L 5/00* (2006.01)
*H04W 16/10* (2009.01)
(Continued)

(52) U.S. Cl.
CPC .......... *H04L 5/0098* (2013.01); *H04L 5/0012* (2013.01); *H04L 5/0048* (2013.01);
(Continued)

(58) Field of Classification Search
CPC ............... H04L 5/0048; H04L 5/0051; H04W 72/0413; H04W 72/0446; H04W 72/0453; H04W 72/0406; H04W 72/1284
See application file for complete search history.

(56) References Cited

U.S. PATENT DOCUMENTS

2009/0238241 A1* 9/2009 Hooli ................... H04B 1/7143
375/133
2009/0316676 A1* 12/2009 Kolding ................ H04L 1/0026
370/345
(Continued)

FOREIGN PATENT DOCUMENTS

CN 102595514 A 7/2012
CN 103155472 A 6/2013
(Continued)

OTHER PUBLICATIONS

Author Unknown, 3rd Generation Partnership Project, Technical Specification Group Radio Access Network, Evolved Universal Terrestrial Radio Access (E-UTRA), Physical channels and modulation (Release 12), pp. 1-124, Dec. 2014 (Year: 2014).*
(Continued)

*Primary Examiner* — Christopher M Crutchfield
(74) *Attorney, Agent, or Firm* — Conley Rose, P.C.

(57) ABSTRACT

A communications apparatus and an uplink reference signal communication method. User equipment (UE) transmits an uplink reference signal of the UE according to reference signal bandwidth configuration information for the UE, reference signal frequency hopping interval information for the UE, and a frequency domain position parameter. Because the reference signal frequency hopping interval information for the UE is added as a parameter, further sampling is performed when frequency hopping of the uplink reference signal is performed. Therefore, a quantity of measurement times is reduced, and efficiency of channel quality measurement is improved.

18 Claims, 4 Drawing Sheets

(51) Int. Cl.
*H04W 72/04* (2009.01)
*H04B 7/02* (2018.01)

(52) U.S. Cl.
CPC ........... *H04L 5/0092* (2013.01); *H04W 16/10* (2013.01); *H04W 72/0453* (2013.01); *H04B 7/02* (2013.01)

(56) References Cited

U.S. PATENT DOCUMENTS

| | | | | |
|---|---|---|---|---|
| 2011/0110398 | A1* | 5/2011 | Zhang | H04L 5/0051 375/132 |
| 2011/0129033 | A1* | 6/2011 | Dai | H04B 7/063 375/299 |
| 2011/0164489 | A1* | 7/2011 | Papasakellariou | H04W 72/0413 370/203 |
| 2011/0261716 | A1* | 10/2011 | Kim | H04B 7/0671 370/252 |
| 2011/0294529 | A1* | 12/2011 | Luo | H04L 5/0035 455/509 |
| 2013/0070725 | A1* | 3/2013 | Wang | H04L 5/0048 370/330 |
| 2013/0194908 | A1 | 8/2013 | Gao et al. | |
| 2013/0286994 | A1 | 10/2013 | Liu | |
| 2015/0110037 | A1 | 4/2015 | Wu et al. | |
| 2015/0245375 | A1* | 8/2015 | Li | H04L 5/0051 370/329 |
| 2015/0372724 | A1 | 12/2015 | Deng et al. | |
| 2017/0126379 | A1* | 5/2017 | Choi | H04L 1/00 |
| 2017/0288834 | A1* | 10/2017 | Yuan | H04L 5/0026 |

FOREIGN PATENT DOCUMENTS

| | | | | |
|---|---|---|---|---|
| CN | 103457690 | A | | 12/2013 |
| CN | 103906120 | A | | 7/2014 |
| CN | 104283582 | A | | 1/2015 |
| WO | WO/2013/049962 | | * | 4/2013 ............ H04W 72/12 |

OTHER PUBLICATIONS

Toskala, A., et al., "Physical Layer (Chapter 5)," In: "LTE for UMTS: OFDMA and SC-FDMA Based Radio Access," XP55051915, Jun. 12, 2009, Wiley, 54 pages.
"Signalling for SRS Hopping Bandwidth," 3GPP TSG RAN WG1 Meeting #53bis, R1-082570, NTT DoCoMo, Panasonic, Jun. 30-Jul. 4, 2008, 4 pages.
Foreign Communication From a Counterpart Application, European Application No. 15882326.0, Extended European Search Report dated Jan. 18, 2018, 10 pages.
Machine Translation and Abstract of Chinese Publication No. CN104283582, Jan. 14, 2015, 26 pages.
"3rd Generation Partnership Project; Technical Specification Group Radio Access Network; Evolved Universal Terrestrial Radio Access (E-UTRA); Physical layer procedures (Release 12)," 3GPP TS 36.213 V12.4.0, Technical Specification, Dec. 2014, 225 pages.
Foreign Communication From a Counterpart Application, PCT Application No. PCT/CN2015/073216, English Translation of International Search Report dated Dec. 18, 2015, 2 pages.
Foreign Communication From a Counterpart Application, PCT Application No. PCT/CN2015/073216, English Translation of Written Opinion dated Dec. 18, 2015, 6 pages.
"3rd Generation Partnership Project; Technical Specification Group Radio Access Network; Evolved Universal Terrestrial Radio Access (E-UTRA); Physical channels and modulation (Release 12)," 3GPP TS 36.211, V12.4.0, Dec. 2014, 124 pages.
Foreign Communication From a Counterpart Application, Chinese Application No. 201810723345.8, Chinese Office Action dated Mar. 15, 2019, 4 pages.
Machine Translation and Abstract of Chinese Publication No. CN103155472, Jun. 12, 2013, 24 pages.
Foreign Communication From a Counterpart Application, Chinese Application No. 201810723426.8, Chinese Office Action dated Apr. 1, 2019, 7 pages.

* cited by examiner

The UE transmits an uplink reference signal of the UE according to reference signal bandwidth configuration information for the UE, reference signal frequency hopping interval information for the UE, and a frequency domain position parameter ~ 101

FIG. 6

UE receives a configuration message sent by a base station ~ 100

The UE transmits an uplink reference signal of the UE according to reference signal bandwidth configuration information for the UE, reference signal frequency hopping interval information for the UE, and a frequency domain position parameter ~ 101

FIG. 7

A base station notifies UE of reference signal bandwidth configuration information for the UE, reference signal frequency hopping interval information for the UE, and a frequency domain position parameter ~ 200

The base station receives an uplink reference signal sent by the UE ~ 201

FIG. 8

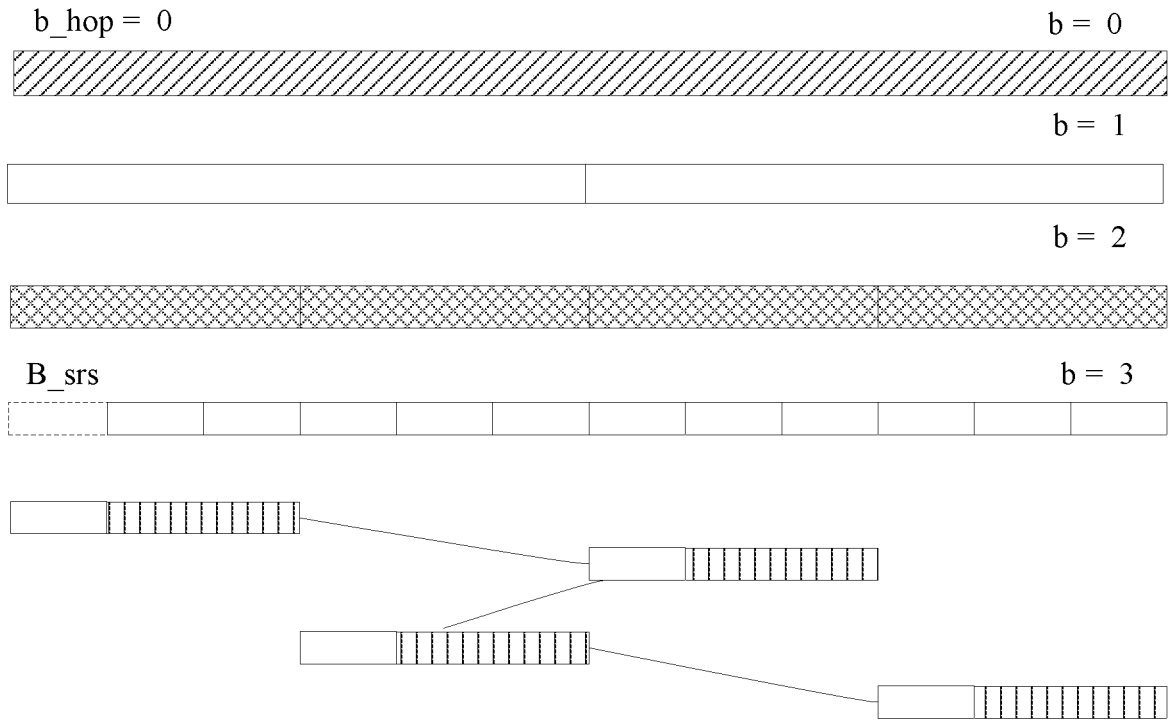
FIG. 9
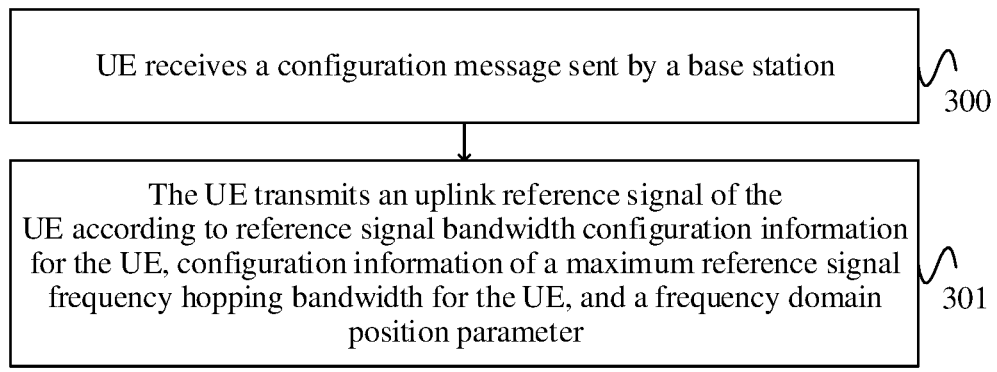
FIG. 10
FIG. 11

COMMUNICATIONS APPARATUS AND UPLINK REFERENCE SIGNAL COMMUNICATION METHOD

CROSS-REFERENCE TO RELATED APPLICATION

This application is a continuation of International Patent Application No. PCT/CN2015/073216 filed on Feb. 17, 2015, which is hereby incorporated by reference in its entirety.

TECHNICAL FIELD

The present disclosure relates to the field of wireless communications technologies, and in particular, to a communications apparatus and an uplink reference signal communication method.

BACKGROUND

A spectrum is an extremely expensive resource in wireless communication. Modern communications systems, such as a Global System for Mobile Communications (GSM) system, a Code Division Multiple Access (CDMA) 2000/Wideband CDMA (WCDMA) system, and a Long Term Evolution (LTE) system, generally operate on a carrier frequency below 3 gigahertz (GHz). With popularity of intelligent terminals, especially emergence of video services, it is difficult for current spectrum resources to meet an explosively-increasing requirement of a user for a capacity. A high frequency band with a larger available bandwidth, especially a millimeter-wave band, gradually becomes a candidate frequency band of a next generation communications system. For example, within a range of 3 GHz to 200 GHz, a potential available bandwidth is approximately 250 GHz. In addition, a multiple-antenna technology is usually used in the modern communications system to improve a capacity and coverage of the system or to improve user experience. Another advantage brought using the high frequency band is as follows. A size of multiple configured antennas can be greatly reduced in order to facilitate site obtaining and deployment of more antennas. However, the high frequency band results in a larger path loss, and especially, impact of factors such as an atmosphere and vegetation further exacerbates a wireless propagation loss.

For transmission of an uplink sounding reference signal (SRS) of a user to overcome the larger path loss, usually larger transmit power needs to be set to compensate for a large loss in a high-frequency propagation process. Due to the larger path loss, a cell-edge user needs the larger transmit power or even full power to resolve a problem that coverage of the user is limited. Because power is limited, the user can send an SRS only using a smaller user-specific SRS bandwidth. In addition, in a high frequency, as a system bandwidth increases, a quantity of resource blocks (RBs) corresponding to the system bandwidth multiplies. For example, corresponding quantities of RBs used when the system bandwidth is 500 megabytes (MB) and 1 gigabyte (GB) are respectively 2.5 times and 5 times a quantity of RBs used when the system bandwidth is 10 MB. In time division duplex (TDD) that is used as a mainstream multiple access multiplexing manner in a high frequency, a base station may obtain, by means of measurement, channel quality on an entire downlink system bandwidth according to reciprocity of uplink and downlink channels using uplink SRS channel quality.

However, in an uplink reference signal transmission manner used in other approaches, when a user-specific SRS bandwidth configured by a user is relatively small, efficiency of full-bandwidth channel quality measurement of a system is relatively low.

SUMMARY

The present disclosure provides a communications apparatus and an uplink reference signal communication method in order to improve efficiency of full-bandwidth channel quality measurement of a system.

A first aspect of the present disclosure provides user equipment (UE), including a sending module configured to transmit an uplink reference signal of the UE according to reference signal bandwidth configuration information for the UE, reference signal frequency hopping interval information for the UE, and a frequency domain position parameter, where the reference signal bandwidth configuration information for the UE indicates a user-specific reference signal bandwidth used by the UE to send the uplink reference signal, the reference signal frequency hopping interval information for the UE indicates a frequency domain granularity of a frequency hopping interval used when frequency-domain frequency hopping of the uplink reference signal is performed, the frequency domain position parameter indicates a frequency domain position that is of the uplink reference signal and is obtained after the UE performs reference signal frequency-domain frequency hopping, and the frequency domain granularity is greater than or equal to the user-specific reference signal bandwidth used by the UE to send the reference signal.

With reference to the first aspect, in a first feasible implementation, the UE further includes a receiving module configured to receive a configuration message sent by a base station before the sending module transmits the uplink reference signal of the UE according to the reference signal bandwidth configuration information for the UE, the reference signal frequency hopping interval information for the UE, and the frequency domain position parameter, where the configuration message includes the reference signal frequency hopping interval information for the UE, and the reference signal frequency hopping interval information for the UE is configured in a manner of higher layer signaling semi-static configuration.

With reference to the first aspect or the first feasible implementation of the first aspect, in a second feasible implementation, that the frequency domain granularity is greater than or equal to the bandwidth used by the UE to send the reference signal includes that the frequency domain granularity is an integer multiple of the bandwidth used by the UE to send the reference signal.

With reference to the first aspect, the first feasible implementation of the first aspect, or the second feasible implementation of the first aspect, in a third feasible implementation, the frequency domain position parameter is obtained using the following formula:

$$n_{b'} = \begin{cases} \lfloor 4n_{RRC}/(m_{SRS,b} \cdot D_h)\rfloor \bmod N_{b'} & b' \le b_{hop} \\ \{F_{b'}(n_{SRS}) + \lfloor 4n_{RRC}/(m_{SRS,b} \cdot D_h)\rfloor\} \bmod N_{b'} & \text{otherwise} \end{cases},$$

where $n_{b'}$ is the frequency domain position parameter, $b_{hop}$ is a tree-like structure index of a target frequency hopping bandwidth, b is a tree-like structure index of a currently-traversed frequency hopping bandwidth, $n_{RRC}$ is a frequency domain position parameter given by a higher layer, $m_{SRS,b}$ is the user-specific SRS bandwidth used by the UE to send the uplink reference signal, $D_h$ is the frequency domain granularity, $F_{b'}(n_{SRS})$ is a frequency domain position offset value of the UE, $n_{SRS}$ is a frequency hopping count value, $N_{b'}$ is a node quantity of $b'^{th}$-level nodes in a tree-like structure, and the frequency hopping bandwidth is a frequency domain range that exists when frequency-domain frequency hopping of the uplink reference signal is performed.

With reference to the third feasible implementation of the first aspect, in a fourth feasible implementation, $F_{b'}(n_{SRS})$ is obtained using the following formula:

$$F_{b'}(n_{SRS}) = \begin{cases} \left(\frac{N_{b'}}{2}\right)\left[\frac{n_{SRS} \bmod \prod_{b'=b_{hop}}^{b'} N_{b'}}{\prod_{b'=b_{hop}}^{b'-1} N_{b'}} + \frac{n_{SRS} \bmod \prod_{b'=b_{hop}}^{b'} N_{b'}}{2\prod_{b'=b_{hop}}^{b'-1} N_{b'}}\right] & \text{if } N_{b'} \text{ is an even number} \\ \left\lfloor\frac{N_{b'}}{2}\right\rfloor\left[n_{SRS} \prod_{b'=b_{hop}}^{b'} N_{b'}\right] & \text{if } N_{b'} \text{ is an odd number} \end{cases}$$

where b' is a level number of a node in a tree-like structure of the traversed frequency hopping bandwidth.

With reference to any one of the first aspect or the feasible implementations of the first aspect, in a fifth feasible implementation, the sending module is further configured to send the uplink reference signal on a symbol, in each timeslot, for sending a channel quality indicator (CQI) and/or a symbol, in each timeslot, for sending a precoding matrix indicator (PMI).

A second aspect of the present disclosure provides a base station, including a sending module configured to notify the UE of reference signal bandwidth configuration information for the UE, reference signal frequency hopping interval information for the UE, and a frequency domain position parameter, where the reference signal bandwidth configuration information for the UE indicates a user-specific reference signal bandwidth used by the UE to send an uplink reference signal, the reference signal frequency hopping interval information for the UE indicates a frequency domain granularity of a frequency hopping interval used when frequency-domain frequency hopping of the uplink reference signal is performed, the frequency domain position parameter indicates a frequency domain position that is of the uplink reference signal and is obtained after the UE performs reference signal frequency-domain frequency hopping, and the frequency domain granularity is greater than or equal to the user-specific reference signal bandwidth used by the UE to send the reference signal, and a receiving module configured to receive the uplink reference signal sent by the UE.

With reference to the second aspect, in a first feasible implementation, the sending module is further configured to send a configuration message to the UE, where the configuration message includes the reference signal frequency hopping interval information for the UE, and the configuration message is sent in a manner of higher layer signaling semi-static configuration.

With reference to the second aspect or the first feasible implementation of the second aspect, in a second feasible implementation, that the frequency domain granularity is greater than or equal to the bandwidth used by the UE to send the reference signal includes that the frequency domain granularity is an integer multiple of the bandwidth used by the UE to send the reference signal.

With reference to the second aspect, the first feasible implementation of the second aspect, or the second feasible implementation of the second aspect, in a third feasible implementation, the frequency domain position parameter is obtained using the following formula:

$$n_{b'} = \begin{cases} \lfloor 4n_{RRC}/(m_{SRS,b} \cdot D_h)\rfloor \bmod N_{b'} & b' \leq b_{hop} \\ \{F_{b'}(n_{SRS}) + \lfloor 4n_{RRC}/(m_{SRS,b} \cdot D_h)\rfloor\} \bmod N_{b'} & \text{otherwise} \end{cases},$$

where $n_{b'}$ is the frequency domain position parameter, $b_{hop}$ is a tree-like structure index of a target frequency hopping bandwidth, b' is a tree-like structure index of a currently-traversed frequency hopping bandwidth, $n_{RRC}$ is a frequency domain position parameter given by a higher layer, $m_{SRS,b}$ is the user-specific SRS bandwidth used by the UE to send the uplink reference signal, $D_h$ is the frequency domain granularity of frequency hopping, $F_{b'}(n_{SRS})$ is a frequency domain position offset value of the UE, $n_{SRS}$ is a frequency hopping count value, $N_{b'}$ is a node quantity of $b'^{th}$-level nodes in a tree-like structure, and the frequency hopping bandwidth is a frequency domain range that exists when frequency-domain frequency hopping of the uplink reference signal is performed.

With reference to the third feasible implementation of the second aspect, in a fourth feasible implementation, $F_{b'}(n_{SRS})$ is obtained using the following formula:

$$F_{b'}(n_{SRS}) = \begin{cases} \left(\frac{N_{b'}}{2}\right)\left[\frac{n_{SRS} \bmod \prod_{b'=b_{hop}}^{b'} N_{b'}}{\prod_{b'=b_{hop}}^{b'-1} N_{b'}} + \frac{n_{SRS} \bmod \prod_{b'=b_{hop}}^{b'} N_{b'}}{2\prod_{b'=b_{hop}}^{b'-1} N_{b'}}\right] & \text{if } N_{b'} \text{ is an even number} \\ \left\lfloor\frac{N_{b'}}{2}\right\rfloor\left[n_{SRS} \prod_{b'=b_{hop}}^{b'} N_{b'}\right] & \text{if } N_{b'} \text{ is an odd number} \end{cases}$$

where b' is a level number of a node in a tree-like structure of the traversed frequency hopping bandwidth.

With reference to any one of the second aspect or the feasible implementations of the second aspect, in a fifth feasible implementation, the sending module is further configured to receive the uplink reference signal on a symbol, in each timeslot, for sending a CQI and/or a symbol, in each timeslot, for sending a PMI.

A third aspect of the present disclosure provides UE, including a sending module configured to transmit an uplink reference signal of the UE according to reference signal bandwidth configuration information for the UE, configuration information of a maximum reference signal frequency hopping bandwidth for the UE, and a frequency domain position parameter, where the reference signal bandwidth configuration information for the UE indicates a user-specific reference signal bandwidth used by the UE to send the uplink reference signal, the configuration information of a maximum reference signal frequency hopping bandwidth for the UE indicates a maximum frequency hopping bandwidth that is of the uplink reference signal and that can be supported by the UE, and the frequency domain position parameter indicates a frequency domain position that is of the uplink reference signal and is obtained after the UE performs reference signal frequency-domain frequency hopping.

With reference to the third aspect, in a first feasible implementation, the UE further includes a receiving module configured to receive a configuration message sent by a base station before the sending module transmits the uplink reference signal of the UE according to the reference signal bandwidth configuration information for the UE, the configuration information of a maximum reference signal frequency hopping bandwidth for the UE, and the frequency domain position parameter, where the configuration message includes the configuration information of a maximum reference signal frequency hopping bandwidth for the UE, and the configuration information of a maximum reference signal frequency hopping bandwidth for the UE is configured in a manner of higher layer signaling semi-static configuration.

With reference to the first feasible implementation of the third aspect, in a second feasible implementation, the configuration message further includes cell-specific reference signal bandwidth configuration information. The cell-specific reference signal bandwidth configuration information has a correspondence with the configuration information of a maximum reference signal frequency hopping bandwidth for the UE, and the UE further includes a processing module configured to determine the configuration information of a maximum reference signal frequency hopping bandwidth for the UE according to the cell-specific reference signal bandwidth configuration information.

With reference to the third aspect, the first feasible implementation of the third aspect, or the second feasible implementation of the third aspect, in a third feasible implementation, the sending module is further configured to send the uplink reference signal on a symbol, in each timeslot, for sending a CQI and/or a symbol, in each timeslot, for sending a PMI.

A fourth aspect of the present disclosure provides a base station, including a sending module configured to notify the UE of reference signal bandwidth configuration information for the UE, configuration information of a maximum reference signal frequency hopping bandwidth for the UE, and a frequency domain position parameter, where the reference signal bandwidth configuration information for the UE indicates a user-specific reference signal bandwidth used by the UE to send an uplink reference signal, the configuration information of a maximum reference signal frequency hopping bandwidth for the UE indicates a maximum frequency hopping bandwidth that is of the uplink reference signal and that can be supported by the UE, and the frequency domain position parameter indicates a frequency domain position that is of the uplink reference signal and is obtained after the UE performs reference signal frequency-domain frequency hopping, and a receiving module configured to receive the uplink reference signal sent by the UE.

With reference to the fourth aspect, in a first feasible implementation, the sending module is further configured to send a configuration message to the UE, where the configuration message includes the configuration information of a maximum reference signal frequency hopping bandwidth for the UE, and the configuration message is sent in a manner of higher layer signaling semi-static configuration.

With reference to the first feasible implementation of the fourth aspect, in a second feasible implementation, the configuration message further includes cell-specific reference signal bandwidth configuration information, and the cell-specific reference signal bandwidth configuration information has a correspondence with the configuration information of a maximum reference signal frequency hopping bandwidth for the UE such that the UE determines the configuration information of a maximum reference signal frequency hopping bandwidth for the UE according to the cell-specific reference signal bandwidth configuration information.

With reference to the fourth aspect, the first feasible implementation of the fourth aspect, or the second feasible implementation of the fourth aspect, in a third feasible implementation, the sending module is further configured to receive the uplink reference signal on a symbol, in each timeslot, for sending a CQI and/or a symbol, in each timeslot, for sending a PMI.

A fifth aspect of the present disclosure provides UE, including a transmitter configured to transmit an uplink reference signal of the UE according to reference signal bandwidth configuration information for the UE, reference signal frequency hopping interval information for the UE, and a frequency domain position parameter, where the reference signal bandwidth configuration information for the UE indicates a user-specific reference signal bandwidth used by the UE to send the uplink reference signal, the reference signal frequency hopping interval information for the UE indicates a frequency domain granularity of a frequency hopping interval used when frequency-domain frequency hopping of the uplink reference signal is performed, the frequency domain position parameter indicates a frequency domain position that is of the uplink reference signal and is obtained after the UE performs reference signal frequency-domain frequency hopping, and the frequency domain granularity is greater than or equal to the user-specific reference signal bandwidth used by the UE to send the reference signal.

With reference to the fifth aspect, in a first feasible implementation, the UE further includes a receiver configured to receive a configuration message sent by a base station before the transmitter transmits the uplink reference signal of the UE according to the reference signal bandwidth configuration information for the UE, the reference signal frequency hopping interval information for the UE, and the frequency domain position parameter, where the configuration message includes the reference signal frequency hopping interval information for the UE, and the reference signal frequency hopping interval information for the UE is configured in a manner of higher layer signaling semi-static configuration.

With reference to the fifth aspect or the first feasible implementation of the fifth aspect, in a second feasible implementation, that the frequency domain granularity is greater than or equal to the bandwidth used by the UE to send the reference signal includes that the frequency domain granularity is an integer multiple of the bandwidth used by the UE to send the reference signal.

With reference to the fifth aspect, the first feasible implementation of the fifth aspect, or the second feasible implementation of the fifth aspect, in a third feasible implementation, the frequency domain position parameter is obtained using the following formula:

$$n_{b'} = \begin{cases} \lfloor 4n_{RRC}/(m_{SRS,b} \cdot D_h) \rfloor \bmod N_{b'} & b' \leq b_{hop} \\ \{F_{b'}(n_{SRS}) + \lfloor 4n_{RRC}/(m_{SRS,b} \cdot D_h) \rfloor\} \bmod N_{b'} & \text{otherwise} \end{cases},$$

where $n_{b'}$ is the frequency domain position parameter, $b_{hop}$ is a tree-like structure index of a target frequency hopping bandwidth, b' is a tree-like structure index of a currently-traversed frequency hopping bandwidth, $n_{RRC}$ is a frequency domain position parameter given by a higher layer, $m_{SRS,b}$ is the user-specific SRS bandwidth used by the UE to send the uplink reference signal, $D_h$ is the frequency domain granularity, $F_{b'}(n_{SRS})$ is a frequency domain position offset value of the UE, $n_{SRS}$ is a frequency hopping count value, $N_{b'}$ is a node quantity of $b'^{th}$-level nodes in a tree-like structure, and the frequency hopping bandwidth is a frequency domain range that exists when frequency-domain frequency hopping of the uplink reference signal is performed.

With reference to the third feasible implementation of the fifth aspect, in a fourth feasible implementation, $F_{b'}(n_{SRS})$ is obtained using the following formula:

$$F_{b'}(n_{SRS}) = \begin{cases} \left(\frac{N_{b'}}{2}\right)\left\lfloor\frac{n_{SRS}\bmod \prod_{b'=b_{hop}}^{b'} N_{b'}}{\prod_{b'=b_{hop}}^{b'-1} N_{b'}}\right\rfloor + \left\lfloor\frac{n_{SRS}\bmod \prod_{b'=b_{hop}}^{b'} N_{b'}}{2\prod_{b'=b_{hop}}^{b'-1} N_{b'}}\right\rfloor & \text{if } N_{b'} \text{ is an even number} \\ \left\lfloor\frac{N_{b'}}{2}\right\rfloor\left\lfloor n_{SRS} \prod_{b'=b_{hop}}^{b'} N_{b'}\right\rfloor & \text{if } N_{b'} \text{ is an odd number} \end{cases}$$

where b' is a level number of a node in a tree-like structure of the traversed frequency hopping bandwidth.

With reference to any one of the fifth aspect or the feasible implementations of the fifth aspect, in a fifth feasible implementation, the transmitter is further configured to send the uplink reference signal on a symbol, in each timeslot, for sending a CQI and/or a symbol, in each timeslot, for sending a PMI.

A sixth aspect of the present disclosure provides a base station, including a transmitter configured to notify the UE of reference signal bandwidth configuration information for the UE, reference signal frequency hopping interval information for the UE, and a frequency domain position parameter, where the reference signal bandwidth configuration information for the UE indicates a user-specific reference signal bandwidth used by the UE to send an uplink reference signal, the reference signal frequency hopping interval information for the UE indicates a frequency domain granularity of a frequency hopping interval used when frequency-domain frequency hopping of the uplink reference signal is performed, the frequency domain position parameter indicates a frequency domain position that is of the uplink reference signal and is obtained after the UE performs reference signal frequency-domain frequency hopping, and the frequency domain granularity is greater than or equal to the user-specific reference signal bandwidth used by the UE to send the reference signal, and a receiver configured to receive the uplink reference signal sent by the UE.

With reference to the sixth aspect, in a first feasible implementation, the transmitter is further configured to send a configuration message to the UE, where the configuration message includes the reference signal frequency hopping interval information for the UE, and the configuration message is sent in a manner of higher layer signaling semi-static configuration.

With reference to the sixth aspect or the first feasible implementation of the sixth aspect, in a second feasible implementation, that the frequency domain granularity is greater than or equal to the bandwidth used by the UE to send the reference signal includes that the frequency domain granularity is an integer multiple of the bandwidth used by the UE to send the reference signal.

With reference to the sixth aspect, the first feasible implementation of the sixth aspect, or the second feasible implementation of the sixth aspect, in a third feasible implementation, the frequency domain position parameter is obtained using the following formula:

$$n_{b'} = \begin{cases} \lfloor 4n_{RRC}/(m_{SRS,b} \cdot D_h) \rfloor \bmod N_{b'} & b' \leq b_{hop} \\ \{F_{b'}(n_{SRS}) + \lfloor 4n_{RRC}/(m_{SRS,b} \cdot D_h) \rfloor\} \bmod N_{b'} & \text{otherwise} \end{cases},$$

where $n_{b'}$ is the frequency domain position parameter, $b_{hop}$ is a tree-like structure index of a target frequency hopping bandwidth, b' is a tree-like structure index of a currently-traversed frequency hopping bandwidth, $n_{RRC}$ is a frequency domain position parameter given by a higher layer, $m_{SRS,b}$ is the user-specific SRS bandwidth used by the UE to send the uplink reference signal, $D_h$ is the frequency domain granularity of frequency hopping, $F_{b'}(n_{SRS})$ is a frequency domain position offset value of the UE, $n_{SRS}$ is a frequency hopping count value, $N_{b'}$ is a node quantity of $b'^{th}$-level nodes in a tree-like structure, and the frequency hopping bandwidth is a frequency domain range that exists when frequency-domain frequency hopping of the uplink reference signal is performed.

With reference to the third feasible implementation of the sixth aspect, in a fourth feasible implementation, $F_{b'}(n_{SRS})$ is obtained using the following formula:

$$F_{b'}(n_{SRS}) = \begin{cases} \left(\frac{N_{b'}}{2}\right)\left\lfloor\frac{n_{SRS}\bmod \prod_{b'=b_{hop}}^{b'} N_{b'}}{\prod_{b'=b_{hop}}^{b'-1} N_{b'}}\right\rfloor + \left\lfloor\frac{n_{SRS}\bmod \prod_{b'=b_{hop}}^{b'} N_{b'}}{2\prod_{b'=b_{hop}}^{b'-1} N_{b'}}\right\rfloor & \text{if } N_{b'} \text{ is an even number} \\ \left\lfloor\frac{N_{b'}}{2}\right\rfloor\left\lfloor n_{SRS} \prod_{b'=b_{hop}}^{b'} N_{b'}\right\rfloor & \text{if } N_{b'} \text{ is an odd number} \end{cases}$$

where b' is a level number of a node in a tree-like structure of the traversed frequency hopping bandwidth.

With reference to any one of the sixth aspect or the feasible implementations of the sixth aspect, in a fifth feasible implementation, the transmitter is further configured to receive the uplink reference signal on a symbol, in each timeslot, for sending a CQI and/or a symbol, in each timeslot, for sending a PMI.

A seventh aspect of the present disclosure provides UE, including a transmitter configured to transmit an uplink reference signal of the UE according to reference signal bandwidth configuration information for the UE, configuration information of a maximum reference signal frequency hopping bandwidth for the UE, and a frequency domain position parameter, where the reference signal bandwidth configuration information for the UE indicates a user-specific reference signal bandwidth used by the UE to send the uplink reference signal, the configuration information of a maximum reference signal frequency hopping bandwidth for the UE indicates a maximum frequency hopping bandwidth that is of the uplink reference signal and that can be supported by the UE, and the frequency domain position parameter indicates a frequency domain position that is of the uplink reference signal and is obtained after the UE performs reference signal frequency-domain frequency hopping.

With reference to the seventh aspect, in a first feasible implementation, the UE further includes a receiver configured to receive a configuration message sent by a base station before the transmitter transmits the uplink reference signal of the UE according to the reference signal bandwidth configuration information for the UE, the configuration information of a maximum reference signal frequency hopping bandwidth for the UE, and the frequency domain position parameter, where the configuration message includes the configuration information of a maximum reference signal frequency hopping bandwidth for the UE, and the configuration information of a maximum reference signal frequency hopping bandwidth for the UE is configured in a manner of higher layer signaling semi-static configuration.

With reference to the first feasible implementation of the seventh aspect, in a second feasible implementation, the configuration message further includes cell-specific reference signal bandwidth configuration information. The cell-specific reference signal bandwidth configuration information has a correspondence with the configuration information of a maximum reference signal frequency hopping bandwidth for the UE, and the UE further includes a processor configured to determine the configuration information of a maximum reference signal frequency hopping bandwidth for the UE according to the cell-specific reference signal bandwidth configuration information.

With reference to the seventh aspect, the first feasible implementation of the seventh aspect, or the second feasible implementation of the seventh aspect, in a third feasible implementation, the transmitter is further configured to send the uplink reference signal on a symbol, in each timeslot, for sending a CQI and/or a symbol, in each timeslot, for sending a PMI.

An eighth aspect of the present disclosure provides a base station, including a transmitter configured to notify the UE of reference signal bandwidth configuration information for the UE, configuration information of a maximum reference signal frequency hopping bandwidth for the UE, and a frequency domain position parameter, where the reference signal bandwidth configuration information for the UE indicates a user-specific reference signal bandwidth used by the UE to send an uplink reference signal, the configuration information of a maximum reference signal frequency hopping bandwidth for the UE indicates a maximum frequency hopping bandwidth that is of the uplink reference signal and that can be supported by the UE, and the frequency domain position parameter indicates a frequency domain position that is of the uplink reference signal and is obtained after the UE performs reference signal frequency-domain frequency hopping, and a receiver configured to receive the uplink reference signal sent by the UE.

With reference to the eighth aspect, in a first feasible implementation, the transmitter is further configured to send a configuration message to the UE, where the configuration message includes the configuration information of a maximum reference signal frequency hopping bandwidth for the UE, and the configuration message is sent in a manner of higher layer signaling semi-static configuration.

With reference to the first feasible implementation of the eighth aspect, in a second feasible implementation, the configuration message further includes cell-specific reference signal bandwidth configuration information, and the cell-specific reference signal bandwidth configuration information has a correspondence with the configuration information of a maximum reference signal frequency hopping bandwidth for the UE such that the UE determines the configuration information of a maximum reference signal frequency hopping bandwidth for the UE according to the cell-specific reference signal bandwidth configuration information.

With reference to the eighth aspect, the first feasible implementation of the eighth aspect, or the second feasible implementation of the eighth aspect, in a third feasible implementation, the transmitter is further configured to receive the uplink reference signal on a symbol, in each timeslot, for sending a CQI and/or a symbol, in each timeslot, for sending a PMI.

A ninth aspect of the present disclosure provides an uplink reference signal transmission method, including transmitting, by UE, an uplink reference signal of the UE according to reference signal bandwidth configuration information for the UE, reference signal frequency hopping interval information for the UE, and a frequency domain position parameter, where the reference signal bandwidth configuration information for the UE indicates a user-specific reference signal bandwidth used by the UE to send the uplink reference signal, the reference signal frequency hopping interval information for the UE indicates a frequency domain granularity of a frequency hopping interval used when frequency-domain frequency hopping of the uplink reference signal is performed, the frequency domain position parameter indicates a frequency domain position that is of the uplink reference signal and is obtained after the UE performs reference signal frequency-domain frequency hopping, and the frequency domain granularity is greater than or equal to the user-specific reference signal bandwidth used by the UE to send the reference signal.

With reference to the ninth aspect, in a first feasible implementation, before transmitting, by UE, an uplink reference signal of the UE according to reference signal bandwidth configuration information for the UE, reference signal frequency hopping interval information for the UE, and a frequency domain position parameter, the method further includes receiving, by the UE, a configuration message sent by a base station, where the configuration message includes the reference signal frequency hopping interval information for the UE, and the reference signal frequency hopping interval information for the UE is configured in a manner of higher layer signaling semi-static configuration.

With reference to the ninth aspect or the first feasible implementation of the ninth aspect, in a second feasible implementation, that the frequency domain granularity is greater than or equal to the bandwidth used by the UE to send the reference signal includes that the frequency domain granularity is an integer multiple of the bandwidth used by the UE to send the reference signal.

With reference to the ninth aspect, the first feasible implementation of the ninth aspect, or the second feasible implementation of the ninth aspect, in a third feasible implementation, the frequency domain position parameter is obtained using the following formula:

$$n_{b'} = \begin{cases} \lfloor 4n_{RRC}/(m_{SRS,b} \cdot D_h) \rfloor \bmod N_{b'} & b' \leq b_{hop} \\ \{F_{b'}(n_{SRS}) + \lfloor 4n_{RRC}/(m_{SRS,b} \cdot D_h) \rfloor\} \bmod N_{b'} & \text{otherwise} \end{cases},$$

where $n_{b'}$ is the frequency domain position parameter, $b_{hop}$ is a tree-like structure index of a target frequency hopping bandwidth, b' is a tree-like structure index of a currently-traversed frequency hopping bandwidth, $n_{RRC}$ is a frequency domain position parameter given by a higher layer, $m_{SRS,b}$ is the user-specific SRS bandwidth used by the UE to send the uplink reference signal, $D_h$ is the frequency domain granularity, $F_{b'}(n_{SRS})$ is a frequency domain position offset value of the UE, $n_{SRS}$ is a frequency hopping count value, $N_{b'}$ is a node quantity of b'$^{th}$-level nodes in a tree-like structure, and the frequency hopping bandwidth is a frequency domain range that exists when frequency-domain frequency hopping of the uplink reference signal is performed.

With reference to the third feasible implementation of the ninth aspect, in a fourth feasible implementation, $F_{b'}(n_{SRS})$ is obtained using the following formula:

$$F_{b'}(n_{SRS}) = \begin{cases} (N_{b'}/2) \left[ \dfrac{n_{SRS} \bmod \prod_{b''=b_{hop}}^{b'} N_{b''}}{\prod_{b''=b_{hop}}^{b'-1} N_{b''}} + \dfrac{n_{SRS} \bmod \prod_{b''=b_{hop}}^{b'} N_{b''}}{2 \prod_{b''=b_{hop}}^{b'-1} N_{b''}} \right] \\ \quad \text{if } N_{b'} \text{ is an even number} \\ \lfloor N_{b'}/2 \rfloor \left[ n_{SRS} \Big/ \prod_{b''=b_{hop}}^{b'-1} N_{b''} \right] \\ \quad \text{if } N_{b'} \text{ is an odd number} \end{cases},$$

where b' is a level number of a node in a tree-like structure of the traversed frequency hopping bandwidth.

With reference to any one of the ninth aspect or the feasible implementations of the ninth aspect, in a fifth feasible implementation, the method further includes sending, by the UE, the uplink reference signal on a symbol, in each timeslot, for sending a CQI and/or a symbol, in each timeslot, for sending a PMI.

A tenth aspect of the present disclosure provides an uplink reference signal transmission method, including notifying, by a base station, the UE of reference signal bandwidth configuration information for the UE, reference signal frequency hopping interval information for the UE, and a frequency domain position parameter, where the reference signal bandwidth configuration information for the UE indicates a user-specific reference signal bandwidth used by the UE to send an uplink reference signal, the reference signal frequency hopping interval information for the UE indicates a frequency domain granularity of a frequency hopping interval used when frequency-domain frequency hopping of the uplink reference signal is performed, the frequency domain position parameter indicates a frequency domain position that is of the uplink reference signal and is obtained after the UE performs reference signal frequency-domain frequency hopping, and the frequency domain granularity is greater than or equal to the user-specific reference signal bandwidth used by the UE to send the reference signal, and receiving, by the base station, the uplink reference signal sent by the UE.

With reference to the tenth aspect, in a first feasible implementation, notifying, by a base station, reference signal frequency hopping interval information for the UE includes sending, by the base station, a configuration message to the UE, where the configuration message includes the reference signal frequency hopping interval information for the UE, and the configuration message is sent in a manner of higher layer signaling semi-static configuration.

With reference to the tenth aspect or the first feasible implementation of the tenth aspect, in a second feasible implementation, that the frequency domain granularity is greater than or equal to the bandwidth used by the UE to send the reference signal includes that the frequency domain granularity is an integer multiple of the bandwidth used by the UE to send the reference signal.

With reference to the tenth aspect, the first feasible implementation of the tenth aspect, or the second feasible implementation of the tenth aspect, in a third feasible implementation, the frequency domain position parameter is obtained by using the following formula:

$$n_{b'} = \begin{cases} \lfloor 4n_{RRC}/(m_{SRS,b} \cdot D_h) \rfloor \bmod N_{b'} & b' \leq b_{hop} \\ \{F_b \cdot (n_{SRS}) + \lfloor 4n_{RRC}/(m_{SRS,b} \cdot D_h) \rfloor\} \bmod N_{b'} & \text{otherwise} \end{cases},$$

where $n_{b'}$ is the frequency domain position parameter, $b_{hop}$ is a tree-like structure index of a target frequency hopping bandwidth, b' is a tree-like structure index of a currently-traversed frequency hopping bandwidth, $n_{RRC}$ is a frequency domain position parameter given by a higher layer, $m_{SRS,b}$ is the user-specific SRS bandwidth used by the UE to send the uplink reference signal, $D_h$ is the frequency domain granularity of frequency hopping, $F_b(n_{SRS})$ is a frequency domain position offset value of the UE, $n_{SRS}$ is a frequency hopping count value, $N_{b'}$ is a node quantity of b'$^{th}$-level nodes in a tree-like structure, and the frequency hopping bandwidth is a frequency domain range that exists when frequency-domain frequency hopping of the uplink reference signal is performed.

With reference for the third feasible implementation of the tenth aspect, in a fourth feasible implementation, $F_{b'}(n_{SRS})$ is obtained using the following formula:

$$F_{b'}(n_{SRS}) = \begin{cases} (N_{b'}/2) \left[ \dfrac{n_{SRS} \bmod \prod_{b''=b_{hop}}^{b'} N_{b''}}{\prod_{b''=b_{hop}}^{b'-1} N_{b''}} + \dfrac{n_{SRS} \bmod \prod_{b''=b_{hop}}^{b'} N_{b''}}{2 \prod_{b''=b_{hop}}^{b'-1} N_{b''}} \right] \\ \quad \text{if } N_{b'} \text{ is an even number} \\ \lfloor N_{b'}/2 \rfloor \left[ n_{SRS} \Big/ \prod_{b''=b_{hop}}^{b'-1} N_{b''} \right] \\ \quad \text{if } N_{b'} \text{ is an odd number} \end{cases},$$

where b' is a level number of a node in a tree-like structure of the traversed frequency hopping bandwidth.

With reference to any one of the tenth aspect or the feasible implementations of the tenth aspect, in a fifth feasible implementation, the method further includes receiving, by the base station, the uplink reference signal on a symbol, in each timeslot, for sending a CQI and/or a symbol, in each timeslot, for sending a PMI.

An eleventh aspect of the present disclosure provides an uplink reference signal transmission method, including transmitting, by UE, an uplink reference signal of the UE according to reference signal bandwidth configuration information for the UE, configuration information of a maximum reference signal frequency hopping bandwidth for the UE, and a frequency domain position parameter, where the reference signal bandwidth configuration information for the UE indicates a user-specific reference signal bandwidth used by the UE to send the uplink reference signal, the configuration information of a maximum reference signal frequency hopping bandwidth for the UE indicates a maximum frequency hopping bandwidth that is of the uplink reference signal and that can be supported by the UE, and the frequency domain position parameter indicates a frequency domain position that is of the uplink reference signal and is obtained after the UE performs reference signal frequency-domain frequency hopping.

With reference to the eleventh aspect, in a first feasible implementation, before transmitting, by UE, an uplink reference signal of the UE according to reference signal bandwidth configuration information for the UE, configuration information of a maximum reference signal frequency hopping bandwidth for the UE, and a frequency domain position parameter, the method further includes receiving, by the UE, a configuration message sent by a base station, where the configuration message includes the configuration information of a maximum reference signal frequency hopping bandwidth for the UE, and the configuration information of a maximum reference signal frequency hopping bandwidth for the UE is configured in a manner of higher layer signaling semi-static configuration.

With reference to the first feasible implementation of the eleventh aspect, in a second feasible implementation, the configuration message further includes cell-specific reference signal bandwidth configuration information. The cell-specific reference signal bandwidth configuration information has a correspondence with the configuration information of a maximum reference signal frequency hopping bandwidth for the UE, and the UE determines the configuration information of a maximum reference signal frequency hopping bandwidth for the UE according to the cell-specific reference signal bandwidth configuration information.

With reference to the eleventh aspect, the first feasible implementation of the eleventh aspect, or the second feasible implementation of the eleventh aspect, in a third feasible implementation, the method further includes sending, by the UE, the uplink reference signal on a symbol, in each timeslot, for sending a CQI and/or a symbol, in each timeslot, for sending a PMI.

A twelfth aspect of the present disclosure provides an uplink reference signal receiving method, including notifying, by a base station, the UE of reference signal bandwidth configuration information for the UE, configuration information of a maximum reference signal frequency hopping bandwidth for the UE, and a frequency domain position parameter, where the reference signal bandwidth configuration information for the UE indicates a user-specific reference signal bandwidth used by the UE to send an uplink reference signal, the configuration information of a maximum reference signal frequency hopping bandwidth for the UE indicates a maximum frequency hopping bandwidth that is of the uplink reference signal and that can be supported by the UE, and the frequency domain position parameter indicates a frequency domain position that is of the uplink reference signal and is obtained after the UE performs reference signal frequency-domain frequency hopping, and receiving, by the base station, the uplink reference signal sent by the UE.

With reference to the twelfth aspect, in a first feasible implementation, notifying, by a base station, configuration information of a maximum reference signal frequency hopping bandwidth for the UE includes sending, by the base station, a configuration message to the UE, where the configuration message includes the configuration information of a maximum reference signal frequency hopping bandwidth for the UE, and the configuration message is sent in a manner of higher layer signaling semi-static configuration.

With reference to the first feasible implementation of the twelfth aspect, in a second feasible implementation, the configuration message further includes cell-specific reference signal bandwidth configuration information, and the cell-specific reference signal bandwidth configuration information has a correspondence with the configuration information of a maximum reference signal frequency hopping bandwidth for the UE such that the UE determines the configuration information of a maximum reference signal frequency hopping bandwidth for the UE according to the cell-specific reference signal bandwidth configuration information.

With reference to the twelfth aspect, the first feasible implementation of the twelfth aspect, or the second feasible implementation of the twelfth aspect, in a third feasible implementation, the method further includes receiving, by the base station, the uplink reference signal on a symbol, in each timeslot, for sending a CQI and/or a symbol, in each timeslot, for sending a PMI.

According to the communications apparatus and the uplink reference signal communication method provided in embodiments of the present disclosure, UE transmits an uplink reference signal of the UE according to reference signal bandwidth configuration information for the UE, reference signal frequency hopping interval information for the UE, and a frequency domain position parameter. The reference signal bandwidth configuration information for the UE indicates a user-specific reference signal bandwidth used by the UE to send the uplink reference signal. The reference signal frequency hopping interval information for the UE indicates a frequency domain granularity of a frequency hopping interval used when frequency-domain frequency hopping of the uplink reference signal is performed. The frequency domain position parameter indicates a frequency domain position that is of the uplink reference signal and is obtained after the UE performs reference signal frequency-domain frequency hopping. The frequency domain granularity is greater than or equal to the user-specific reference signal bandwidth used by the UE to send the reference signal. Because the reference signal frequency hopping interval information for the UE is added as a parameter when a transmission pattern used by the UE to send the uplink reference signal is determined, a base station performs further sampling when frequency hopping of the uplink reference signal is performed. Therefore, a quantity of measurement times is reduced, and efficiency of channel quality measurement is improved.

BRIEF DESCRIPTION OF DRAWINGS

To describe technical solutions in embodiments of the present disclosure more clearly, the following briefly describes the accompanying drawings required for describing the embodiments. The accompanying drawings in the following description show some embodiments of the present disclosure, and persons of ordinary skill in the art may still derive other drawings from these accompanying drawings without creative efforts.

FIG. 6 is a schematic flowchart of an uplink reference signal communication method according to an embodiment of the present disclosure;

FIG. 7 is a schematic flowchart of another uplink reference signal communication method according to an embodiment of the present disclosure;

FIG. 8 is a schematic flowchart of another uplink reference signal communication method according to an embodiment of the present disclosure;

FIG. 9 is a schematic diagram of a frequency hopping pattern and a frequency domain position obtained after frequency hopping according to an embodiment of the present disclosure;

FIG. 10 is a schematic flowchart of another uplink reference signal communication method according to an embodiment of the present disclosure;

FIG. 11 is a schematic flowchart of another uplink reference signal communication method according to an embodiment of the present disclosure.

DESCRIPTION OF EMBODIMENTS

Figure 1:
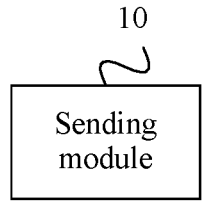
FIG. 1 is a schematic structural diagram of UE according to an embodiment of the present disclosure.

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

In a high frequency, as a system bandwidth increases, a quantity of RBs corresponding to the system bandwidth multiplies. For example, corresponding quantities of RBs used when the system bandwidth is 500 MB and 1 GB are respectively 2.5 times and 5 times a quantity of RBs used when the system bandwidth is 10 MB. In TDD that is used as a mainstream multiple access multiplexing manner in a high frequency, a base station may obtain, by means of measurement, channel quality on an entire downlink system bandwidth according to reciprocity of uplink and downlink channels using uplink SRS channel quality. Therefore, when a user-specific SRS bandwidth configured by a user is relatively small, a relatively large quantity of measurement times and a relatively long time are required for measuring a system bandwidth once, and efficiency of system channel quality measurement is consequently reduced. To resolve such a problem, the embodiments of the present disclosure provide a communications apparatus and an uplink reference signal communication method.

The embodiments of the present disclosure provide a communications apparatus and an uplink reference signal communication method. A core idea of the communications apparatus and the communication method is as follows. In a high frequency scenario, channel quality on a smaller measurement bandwidth is used to replace channel quality on a larger measurement bandwidth. Further, a delay spread in high-frequency channel propagation is far less than a delay spread in low-frequency channel propagation. Table 1 in the following is a contrast table of a delay spread for a high frequency 28 GHz and a delay spread for a low frequency 2 GHz in a three dimensional (3D) urban microcell (UMi) scenario.

TABLE 1

| 3D UMi non line of sight (NLOS) transmission | Low frequency | High frequency |
| --- | --- | --- |
| Delay spread (nanoseconds (ns)) | 128 | 65 |

It can be learned from Table 1 that the delay spread for the high frequency is less than the delay spread for the low frequency. Therefore, a coherence bandwidth for the high frequency is greater than a coherence bandwidth for the low frequency (a coherence bandwidth is inversely proportional to a delay spread). Therefore, a performance loss, in the high frequency, brought by replacing the channel quality on the larger measurement bandwidth with the channel quality on the smaller measurement bandwidth is far less than a performance loss in the low frequency.

It should be noted that, an uplink reference signal in the embodiments of the present disclosure is an SRS unless otherwise specified. However, the solutions in the embodiments of the present disclosure are also applicable to another reference signal. This is not limited herein.

In an SRS transmission process, for each uplink system bandwidth and each cell-specific SRS bandwidth configuration, each user supports at least four optional user-specific SRS bandwidths. Further, the optional user-specific SRS bandwidth is indicated using reference signal bandwidth configuration information. Further, values of the four user-specific SRS bandwidths each meet a requirement that each value is a multiple of four RBs and can be decomposed into prime numbers 2, 3, and 5.

When the user-specific SRS bandwidth is relatively small (equivalent to a narrow band), the user-specific SRS bandwidth may be combined with frequency hopping processing to measure wideband channel quality. There are four frequency hopping bandwidths in total. UE may select a corresponding frequency hopping bandwidth according to an indication of a tree-like structure index of the frequency hopping bandwidth.

Further, frequency hopping of the SRS is configured according to a higher layer parameter, an SRS frequency hopping bandwidth. A value of the parameter $b_{hop}$ is generally one of $\{0, 1, 2, 3\}$. Frequency hopping exists only when the SRS frequency hopping bandwidth is greater than the user-specific SRS bandwidth. For example, when the user-specific SRS bandwidth is 4, and the SRS frequency hopping bandwidth is 96, it is equivalent to that a 4-RB SRS is set at any position on a bandwidth whose maximum SRS bandwidth is 96 RBs, and there are 24 possible starting positions of the SRS. Frequency-domain frequency hopping is equivalent to give a pattern of a parent node that traverses a bandwidth that is a frequency hopping bandwidth. The parent node is a node at a level corresponding to the frequency hopping bandwidth. A frequency domain position parameter obtained after frequency hopping is given by $n_{RRC}$. An actual frequency domain position is jointly determined using parameters such as $n_b$, $m_{SRS,b}$ and $N_b$. That is, these parameters are used to jointly determine a unique position, in a tree-like structure, of a frequency-hopping start node at a level corresponding to the user-specific SRS bandwidth. $n_b$ is the actual frequency domain position obtained after frequency hopping, $m_{SRS,b}$ is the user-specific SRS bandwidth, and $N_b$ is a node quantity of bth-level nodes in the tree-like structure.

Therefore, to implement flexible and quick channel quality measurement, an embodiment of the present disclosure provides a feasible manner. When a user performs SRS frequency-domain frequency hopping, frequency sampling may be further performed, that is, a frequency domain interval may be set when frequency hopping is performed. The frequency domain interval indicates a frequency domain granularity used when the user performs frequency-domain frequency hopping of the SRS. The frequency domain granularity is greater than or equal to a user-specific SRS bandwidth.

The following describes the feasible manner. FIG. 1 is a schematic structural diagram of UE according to an embodiment of the present disclosure. The UE may be an intelligent terminal, such as a smartphone, a tablet, or a wearable intelligent device. Referring to FIG. 1, the UE includes a sending module 10.

The sending module 10 is configured to transmit an uplink reference signal of the UE according to reference signal bandwidth configuration information for the UE, reference signal frequency hopping interval information for the UE, and a frequency domain position parameter.

The reference signal bandwidth configuration information for the UE indicates a user-specific reference signal bandwidth used by the UE to send the uplink reference signal. The reference signal frequency hopping interval information for the UE indicates a frequency domain granularity of a frequency hopping interval used when frequency-domain frequency hopping of the uplink reference signal is performed. The frequency domain position parameter indicates a frequency domain position that is of the uplink reference signal and is obtained after the UE performs reference signal frequency-domain frequency hopping. The frequency domain granularity is greater than or equal to the user-specific reference signal bandwidth used by the UE to send the reference signal.

According to the UE provided in this embodiment of the present disclosure, the sending module 10 transmits an uplink reference signal of the UE according to reference signal bandwidth configuration information for the UE, reference signal frequency hopping interval information for the UE, and a frequency domain position parameter. The reference signal bandwidth configuration information for the UE indicates a user-specific reference signal bandwidth used by the UE to send the uplink reference signal. The reference signal frequency hopping interval information for the UE indicates a frequency domain granularity of a frequency hopping interval used when frequency-domain frequency hopping of the uplink reference signal is performed. The frequency domain position parameter indicates a frequency domain position that is of the uplink reference signal and is obtained after the UE performs reference signal frequency-domain frequency hopping. The frequency domain granularity is greater than or equal to the user-specific reference signal bandwidth used by the UE to send the reference signal. Because the reference signal frequency hopping interval information for the UE is added as a parameter when a transmission pattern used by the UE to send the uplink reference signal is determined, a base station performs further sampling when frequency hopping of the uplink reference signal is performed. Therefore, a quantity of measurement times is reduced, and efficiency of channel quality measurement is improved.

Figure 2:
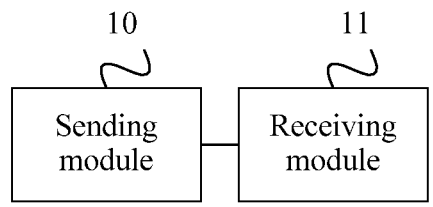
FIG. 2 is a schematic structural diagram of another UE according to an embodiment of the present disclosure.

Based on FIG. 1, FIG. 2 is a schematic structural diagram of another UE according to an embodiment of the present disclosure. Referring to FIG. 2, the UE further includes a receiving module 11.

The receiving module 11 is configured to receive a configuration message sent by a base station before the sending module 10 transmits the uplink reference signal of the UE according to the reference signal bandwidth configuration information for the UE, the reference signal frequency hopping interval information for the UE, and the frequency domain position parameter. The configuration message includes the reference signal frequency hopping interval information for the UE.

The reference signal frequency hopping interval information for the UE is configured in a manner of higher layer signaling semi-static configuration.

For example, higher layer signaling may be semi-static signaling at a radio resource control (RRC) layer.

Optionally, the reference signal frequency hopping interval information for the UE may be configured using layer-one signaling.

For example, the layer-one signaling may be dynamic signaling at a physical layer (PHY) or a Medium Access Control (MAC) layer.

Optionally, that the frequency domain granularity is greater than or equal to the bandwidth used by the UE to send the reference signal includes that the frequency domain granularity is an integer multiple of the bandwidth used by the UE to send the reference signal.

Optionally, the frequency domain position parameter is obtained using the following formula:

$$n_{b'} = \begin{cases} \lfloor 4n_{RRC}/(m_{SRS,b} \cdot D_h) \rfloor \bmod N_{b'} & b' \leq b_{hop} \\ \{F_b \cdot (n_{SRS}) + \lfloor 4n_{RRC}/(m_{SRS,b} \cdot D_h) \rfloor\} \bmod N_{b'} & \text{otherwise} \end{cases},$$

where $n_{b'}$ is the frequency domain position parameter, $b_{hop}$ is a tree-like structure index of a target frequency hopping bandwidth, b' is a tree-like structure index of a currently-traversed frequency hopping bandwidth, $n_{RRC}$ is a frequency domain position parameter given by a higher layer, $m_{SRS,b}$ is the user-specific SRS bandwidth used by the UE to send the uplink reference signal, $D_h$ is the frequency domain granularity, $F_b(n_{SRS})$ is a frequency domain position offset value of the UE, $n_{SRS}$ is a frequency hopping count value, $N_{b'}$ is a node quantity of $b'^{th}$-level nodes in a tree-like structure, and the frequency hopping bandwidth is a frequency domain range that exists when frequency-domain frequency hopping of the uplink reference signal is performed.

Optionally, $F_b(n_{SRS})$ is obtained using the following formula:

$$F_{b'}(n_{SRS}) = \begin{cases} (N_{b'}/2)\left[\left\lfloor\dfrac{n_{SRS}\bmod\prod_{b''=b_{hop}}^{b'}N_{b''}}{\prod_{b''=b_{hop}}^{b'-1}N_{b''}}\right\rfloor + \left\lfloor\dfrac{n_{SRS}\bmod\prod_{b''=b_{hop}}^{b'}N_{b''}}{2\prod_{b''=b_{hop}}^{b'-1}N_{b''}}\right\rfloor\right], \\ \qquad\qquad\qquad\text{if } N_{b'} \text{ is an even number} \\ \lfloor N_{b'}/2\rfloor\left\lfloor n_{SRS}\big/\prod_{b''=b_{hop}}^{b'-1}N_{b''}\right\rfloor \\ \qquad\qquad\qquad\text{if } N_{b'} \text{ is an odd number} \end{cases}$$

where b' is a level number of a node in a tree-like structure of the traversed frequency hopping bandwidth.

b' is the level number of the node in the tree-like structure of the traversed frequency hopping bandwidth. Further, $n_{SRS}$ may be obtained using the following formula:

$$n_{SRS} = \begin{cases} 2N_{SP}n_f + 2(N_{SP}-1)\left\lfloor\dfrac{n_s}{10}\right\rfloor + \left\lfloor\dfrac{T_{offset}}{T_{offset\_max}}\right\rfloor, & \text{for a frame structure type 2 and SRS periodicity of 2 ms} \\ \lfloor(n_f\times 10 + \lfloor n_s/2\rfloor)/T_{SRS}\rfloor, & \text{otherwise} \end{cases}$$

where $n_{SRS}$ is used to count a quantity of times of transmission performed according to the user-specific SRS bandwidth, and $T_{SRS}$ is SRS transmission periodicity used when periodic SRS transmission is performed. $T_{offset}$ is an SRS transmission subframe offset and used to indicate an SRS transmission time sequence. $T_{offset\_max}$ is a maximum subframe offset for an SRS transmission subframe offset configuration. $n_s$ and $n_f$ are respectively a system timeslot number and a system frame number. $N_{SP}$ is a quantity of downlink-to-uplink switch points within a radio frame.

Optionally, the sending module 10 is further configured to send the uplink reference signal on a symbol, in each timeslot, for sending a CQI and/or a symbol, in each timeslot, for sending a PMI.

Figure 3:
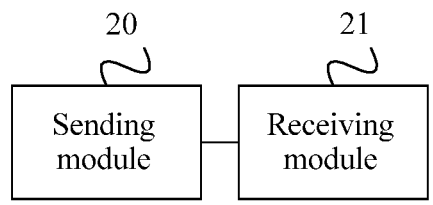
FIG. 3 is a schematic structural diagram of a base station according to an embodiment of the present disclosure.

Corresponding to the UE shown in FIG. 1 or FIG. 2, FIG. 3 is a schematic structural diagram of a base station according to an embodiment of the present disclosure. The base station may be an evolved NodeB, a relay device, a hotspot device, or the like. Referring to FIG. 3, the base station includes a sending module 20 and a receiving module 21.

The sending module 20 is configured to notify the UE of reference signal bandwidth configuration information for the UE, reference signal frequency hopping interval information for the UE, and a frequency domain position parameter.

The reference signal bandwidth configuration information for the UE indicates a user-specific reference signal bandwidth used by the UE to send an uplink reference signal. The reference signal frequency hopping interval information for the UE indicates a frequency domain granularity of a frequency hopping interval used when frequency-domain frequency hopping of the uplink reference signal is performed. The frequency domain position parameter indicates a frequency domain position that is of the uplink reference signal and is obtained after the UE performs reference signal frequency-domain frequency hopping. The frequency domain granularity is greater than or equal to the user-specific reference signal bandwidth used by the UE to send the reference signal.

The receiving module 21 is configured to receive the uplink reference signal sent by the UE.

According to the base station provided in this embodiment of the present disclosure, the sending module 20 notifies the UE of reference signal bandwidth configuration information for the UE, reference signal frequency hopping interval information for the UE, and a frequency domain position parameter. The reference signal bandwidth configuration information for the UE indicates a user-specific reference signal bandwidth used by the UE to send an uplink reference signal. The reference signal frequency hopping interval information for the UE indicates a frequency domain granularity of a frequency hopping interval used when frequency-domain frequency hopping of the uplink reference signal is performed. The frequency domain position parameter indicates a frequency domain position that is of the uplink reference signal and is obtained after the UE performs reference signal frequency-domain frequency hopping. The frequency domain granularity is greater than or equal to the user-specific reference signal bandwidth used by the UE to send the reference signal. Then, the receiving module 21 receives the uplink reference signal sent by the UE. Because the reference signal frequency hopping interval information for the UE is added as a parameter when a transmission pattern used by the UE to send the uplink reference signal is determined, the base station performs further sampling when frequency hopping of the uplink reference signal is performed. Therefore, a quantity of measurement times is reduced, and efficiency of channel quality measurement is improved.

Optionally, the sending module 20 is further configured to send a configuration message to the UE. The configuration message includes the reference signal frequency hopping interval information for the UE, and the configuration message is sent in a manner of higher layer signaling semi-static configuration. Optionally, the configuration message may be sent in a layer-one signaling notification manner.

Optionally, that the frequency domain granularity is greater than or equal to the bandwidth used by the UE to send the reference signal includes that the frequency domain granularity is an integer multiple of the bandwidth used by the UE to send the reference signal.

Optionally, the frequency domain position parameter is obtained using the following formula:

$$n_{b'} = \begin{cases} \lfloor 4n_{RRC}/(m_{SRS,b}\cdot D_h)\rfloor\bmod N_{b'} & b'\leq b_{hop} \\ \{F_b\cdot(n_{SRS}) + \lfloor 4n_{RRC}/(m_{SRS,b}\cdot D_h)\rfloor\}\bmod N_{b'} & \text{otherwise} \end{cases},$$

where $n_{b'}$ is the frequency domain position parameter, $b_{hop}$ is a tree-like structure index of a target frequency hopping bandwidth, b' is a tree-like structure index of a currently-traversed frequency hopping bandwidth, $n_{RRC}$ is a frequency domain position parameter given by a higher layer, $m_{SRS,b}$ is the user-specific SRS bandwidth used by the UE to send the uplink reference signal, $D_h$ is the frequency domain granularity of frequency hopping, $F_b(n_{SRS})$ is a frequency domain position offset value of the UE, $n_{SRS}$ is a frequency hopping count value, $N_{b'}$ is a node quantity of $b'^{th}$-level nodes in a tree-like structure, and the frequency hopping bandwidth is a frequency domain range that exists when frequency-domain frequency hopping of the uplink reference signal is performed.

Optionally, $F_b(n_{SRS})$ is obtained using the following formula:

$$F_{b'}(n_{SRS}) = \begin{cases} (N_{b'}/2) \left[ \left\lfloor \dfrac{n_{SRS} \bmod \prod_{b''=b_{hop}}^{b'} N_{b''}}{\prod_{b''=b_{hop}}^{b'-1} N_{b''}} \right\rfloor + \left\lfloor \dfrac{n_{SRS} \bmod \prod_{b''=b_{hop}}^{b'} N_{b''}}{2 \prod_{b''=b_{hop}}^{b'-1} N_{b''}} \right\rfloor \right], \\ \qquad \text{if } N_{b'} \text{ is an even number} \\ \lfloor N_{b'}/2 \rfloor \left\lfloor n_{SRS} \Big/ \prod_{b''=b_{hop}}^{b'-1} N_{b''} \right\rfloor \\ \qquad \text{if } N_{b'} \text{ is an odd number} \end{cases}$$

where b' is a level number of a node in a tree-like structure of the traversed frequency hopping bandwidth.

Further, $n_{SRS}$ may be obtained using the following formula:

$$n_{SRS} = \begin{cases} 2N_{SP}n_f + 2(N_{SP}-1)\left\lfloor \dfrac{n_s}{10} \right\rfloor + \left\lfloor \dfrac{T_{offset}}{T_{offset\_max}} \right\rfloor, & \text{for a frame structure type 2 and SRS periodicity of 2 ms} \\ \lfloor (n_f \times 10 + \lfloor n_s/2 \rfloor)/T_{SRS} \rfloor, & \text{otherwise} \end{cases}$$

where $n_{SRS}$ is used to count a quantity of times of transmission performed according to the user-specific SRS bandwidth, and $T_{SRS}$ is SRS transmission periodicity used when periodic SRS transmission is performed. offset is an SRS transmission subframe offset and used to indicate an SRS transmission time sequence. $T_{offset\_max}$ is a maximum subframe offset for an SRS transmission subframe offset configuration. $n_s$ and $n_f$ are respectively a system timeslot number and a system frame number. $N_{SP}$ is a quantity of downlink-to-uplink switch points within a radio frame.

Optionally, the sending module 20 is further configured to receive the uplink reference signal on a symbol, in each timeslot, for sending a CQI and/or a symbol, in each timeslot, for sending a PMI.

To implement flexible and quick full-bandwidth channel quality measurement, an embodiment of the present disclosure provides another feasible manner. A maximum user-specific SRS bandwidth is set for each uplink system bandwidth. That is, different maximum measurable SRS bandwidths are set for different users in each cell. Referring to Table 2, that is, a cell-specific parameter $C_{SRS}$ is extended to configuration information of a maximum measurable reference signal bandwidth for the UE. Alternatively, configuration information of a maximum measurable reference signal bandwidth for the UE is further set for a cell-specific parameter $C_{SRS}$. For example, compared with a cell-center user, a cell-edge user may have configuration information of a smaller maximum measurable reference signal bandwidth. Therefore, an uplink channel quality measurement time can be greatly reduced when the system bandwidth is relatively large.

The following describes the feasible manner. Continuing to refer to FIG. 1, the sending module 10 of the UE further has the following function.

The sending module 10 is configured to transmit an uplink reference signal of the UE according to reference signal bandwidth configuration information for the UE, configuration information of a maximum reference signal frequency hopping bandwidth for the UE, and a frequency domain position parameter.

The reference signal bandwidth configuration information for the UE indicates a user-specific reference signal bandwidth used by the UE to send the uplink reference signal. The configuration information of a maximum reference signal frequency hopping bandwidth for the UE indicates a maximum frequency hopping bandwidth that is of the uplink reference signal and that can be supported by the UE. The frequency domain position parameter indicates a frequency domain position that is of the uplink reference signal and is obtained after the UE performs reference signal frequency-domain frequency hopping.

The UE provided in this embodiment of the present disclosure is configured to transmit an uplink reference signal of the UE according to reference signal bandwidth configuration information for the UE, configuration information of a maximum reference signal frequency hopping bandwidth for the UE, and a frequency domain position parameter. The reference signal bandwidth configuration information for the UE indicates a user-specific reference signal bandwidth used by the UE to send the uplink reference signal. The configuration information of a maximum reference signal frequency hopping bandwidth for the UE indicates a maximum frequency hopping bandwidth that is of the uplink reference signal and that can be supported by the UE. The frequency domain position parameter indicates a frequency domain position that is of the uplink reference signal and is obtained after the UE performs reference signal frequency-domain frequency hopping. Because the configuration information of a maximum reference signal frequency hopping bandwidth for the UE is set, a maximum value of a reference signal bandwidth that can be used by the UE is limited. Therefore, for some specific UEs such as a cell-edge UE, configuration information of a relatively small maximum reference signal frequency hopping bandwidth may be allocated to the UE to reduce an uplink channel quality measurement time when a system bandwidth is relatively large in order to improve efficiency of channel quality measurement.

Continuing to refer to FIG. 2, the receiving module 11 of the UE has the following function.

The receiving module 11 is configured to receive a configuration message sent by a base station before the sending module 10 transmits the uplink reference signal of the UE according to the reference signal bandwidth configuration information for the UE, the configuration information of a maximum reference signal frequency hopping bandwidth for the UE, and the frequency domain position parameter. The configuration message includes the configuration information of a maximum reference signal frequency hopping bandwidth for the UE.

The configuration information of a maximum reference signal frequency hopping bandwidth for the UE is configured in a manner of higher layer signaling semi-static configuration. Optionally, the reference signal frequency hopping interval information for the UE may be configured using layer-one signaling.

Optionally, the configuration message further includes cell-specific reference signal bandwidth configuration information.

The cell-specific reference signal bandwidth configuration information has a correspondence with the configuration information of a maximum reference signal frequency hopping bandwidth for the UE.

Figure 4:
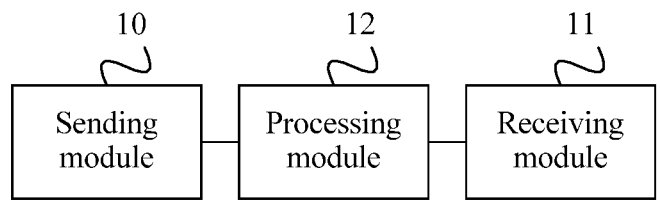
FIG. 4 is a schematic structural diagram of another UE according to an embodiment of the present disclosure.

Based on FIG. 2, FIG. 4 is a schematic structural diagram of another UE according to an embodiment of the present disclosure. Referring to FIG. 4, the UE further includes a processing module 12.

The processing module 12 is configured to determine the configuration information of a maximum reference signal frequency hopping bandwidth for the UE according to the cell-specific reference signal bandwidth configuration information.

Optionally, the sending module 10 is further configured to send the uplink reference signal on a symbol, in each timeslot, for sending a CQI and/or a symbol, in each timeslot, for sending a PMI.

Correspondingly, referring to FIG. 3, the modules of the base station have the following functions.

The sending module 20 is configured to notify the UE of reference signal bandwidth configuration information for the UE, configuration information of a maximum reference signal frequency hopping bandwidth for the UE, and a frequency domain position parameter.

The reference signal bandwidth configuration information for the UE indicates a user-specific reference signal bandwidth used by the UE to send an uplink reference signal. The configuration information of a maximum reference signal frequency hopping bandwidth for the UE indicates a maximum frequency hopping bandwidth that is of the uplink reference signal and that can be supported by the UE. The frequency domain position parameter indicates a frequency domain position that is of the uplink reference signal and is obtained after the UE performs reference signal frequency-domain frequency hopping.

The receiving module 21 is configured to receive the uplink reference signal sent by the UE.

According to the base station provided in this embodiment of the present disclosure, the sending module 20 notifies the UE of reference signal bandwidth configuration information for the UE, configuration information of a maximum reference signal frequency hopping bandwidth for the UE, and a frequency domain position parameter. The reference signal bandwidth configuration information for the UE indicates a user-specific reference signal bandwidth used by the UE to send an uplink reference signal. The configuration information of a maximum reference signal frequency hopping bandwidth for the UE indicates a maximum frequency hopping bandwidth that is of the uplink reference signal and that can be supported by the UE. The frequency domain position parameter indicates a frequency domain position that is of the uplink reference signal and is obtained after the UE performs reference signal frequency-domain frequency hopping. Then, the receiving module 21 receives the uplink reference signal sent by the UE. Because the configuration information of a maximum reference signal frequency hopping bandwidth for the UE is set, a maximum value of a reference signal bandwidth that can be used by the UE is limited. Therefore, for some specific UEs such as a cell-edge UE, configuration information of a relatively small maximum reference signal frequency hopping bandwidth may be allocated to the UE to reduce an uplink channel quality measurement time when a system bandwidth is relatively large in order to improve efficiency of channel quality measurement.

Optionally, the sending module 20 is further configured to send a configuration message to the UE. The configuration message includes the configuration information of a maximum reference signal frequency hopping bandwidth for the UE, and the configuration message is sent in a manner of higher layer signaling semi-static configuration. Optionally, the configuration message may be sent in a layer-one signaling notification manner.

Optionally, the configuration message further includes cell-specific reference signal bandwidth configuration information.

The cell-specific reference signal bandwidth configuration information has a correspondence with the configuration information of a maximum reference signal frequency hopping bandwidth for the UE such that the UE determines the configuration information of a maximum reference signal frequency hopping bandwidth for the UE according to the cell-specific reference signal bandwidth configuration information.

Optionally, the sending module 20 is further configured to receive the uplink reference signal on a symbol, in each timeslot, for sending a CQI and/or a symbol, in each timeslot, for sending a PMI.

Figure 5:
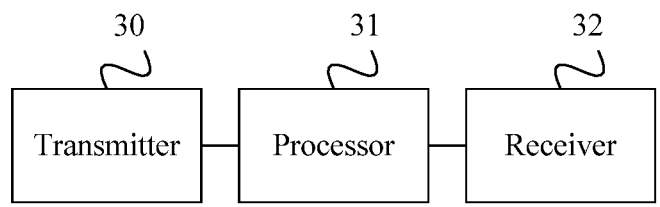
FIG. 5 is a schematic structural diagram of a universal network device according to an embodiment of the present disclosure.

FIG. 5 is a schematic structural diagram of a universal network device according to an embodiment of the present disclosure. Referring to FIG. 5, the universal network device includes a transmitter 30, a processor 31, and a receiver 32.

The UE and the base station described above each may use a structure of the universal network device shown in FIG. 5. Further, when the UE uses the structure of the universal network device, the transmitter 30 has the function of the foregoing sending module 10, the receiver 32 has the function of the foregoing receiving module 11, and the processor 31 has the function of the foregoing processing module 12. That is, the universal network device can achieve corresponding technical effects of the UE in the foregoing embodiments. When the base station uses the structure of the universal network device, the transmitter 30 has the function of the foregoing sending module 20, and the receiver 32 has the function of the foregoing receiving module 21. That is, the universal network device can achieve corresponding technical effects of the base station in the foregoing embodiments.

FIG. 6 is a schematic flowchart of an uplink reference signal communication method according to an embodiment of the present disclosure. The method is executed by UE. Further, the UE may be an intelligent terminal, such as a smartphone, a tablet, or a wearable intelligent device. Referring to FIG. 6, the method includes the following step.

Step 101: The UE transmits an uplink reference signal of the UE according to reference signal bandwidth configuration information for the UE, reference signal frequency hopping interval information for the UE, and a frequency domain position parameter.

The reference signal bandwidth configuration information for the UE indicates a user-specific reference signal bandwidth used by the UE to send the uplink reference signal. The reference signal frequency hopping interval information for the UE indicates a frequency domain granularity of a frequency hopping interval used when frequency-domain frequency hopping of the uplink reference signal is performed. The frequency domain position parameter indicates a frequency domain position that is of the uplink reference signal and is obtained after the UE performs reference signal frequency-domain frequency hopping. The frequency domain granularity is greater than or equal to the user-specific reference signal bandwidth used by the UE to send the reference signal.

According to the uplink reference signal communication method provided in this embodiment of the present disclosure, UE transmits an uplink reference signal of the UE according to reference signal bandwidth configuration information for the UE, reference signal frequency hopping interval information for the UE, and a frequency domain position parameter. The reference signal bandwidth configuration information for the UE indicates a user-specific reference signal bandwidth used by the UE to send the uplink reference signal. The reference signal frequency hopping interval information for the UE indicates a frequency domain granularity of a frequency hopping interval used when frequency-domain frequency hopping of the uplink reference signal is performed. The frequency domain position parameter indicates a frequency domain position that is of the uplink reference signal and is obtained after the UE performs reference signal frequency-domain frequency hopping. The frequency domain granularity is greater than or equal to the user-specific reference signal bandwidth used by the UE to send the reference signal. Because the reference signal frequency hopping interval information for the UE is added as a parameter when a transmission pattern used by the UE to send the uplink reference signal is determined, a base station performs further sampling when frequency hopping of the uplink reference signal is performed. Therefore, a quantity of measurement times is reduced, and efficiency of channel quality measurement is improved.

Optionally, the UE may obtain the reference signal bandwidth configuration information for the UE, the reference signal frequency hopping interval information for the UE, and the frequency domain position parameter using notification by a base station.

Further, based on FIG. 6, FIG. 7 is a schematic flowchart of another uplink reference signal communication method according to an embodiment of the present disclosure. Before step 101, the method further includes the following step.

Step 100: The UE receives a configuration message sent by a base station.

The configuration message includes the reference signal frequency hopping interval information for the UE. The reference signal frequency hopping interval information for the UE is configured in a manner of higher layer signaling semi-static configuration. Optionally, the reference signal frequency hopping interval information for the UE may be configured using layer-one signaling.

Further, the reference signal frequency hopping interval information for the UE is configured by the base station and delivered by the base station to the UE. For each UE, the base station separately configures corresponding reference signal frequency hopping interval information. Therefore, frequency domain granularities of frequency hopping intervals used when frequency-domain frequency hopping of uplink reference signals sent by UEs is performed may be different, or may be the same. A specific configuration is configured by the base station according to a specific environment, and is not limited herein.

Preferably, the frequency domain granularity is an integer multiple of the bandwidth used by the UE to send the reference signal.

Further, for example, the frequency domain granularity may be one time, two times, three times, or five times the user-specific SRS bandwidth used by the UE to send the reference signal. Alternatively, the frequency domain granularity may be a product of a specific uplink system bandwidth and a quantity of nodes at several levels in a tree-like structure corresponding to the user-specific SRS bandwidth used by the UE to send the reference signal. For example, the frequency domain granularity may be N3, N3×N2, or N3×N2×N1 times the user-specific SRS bandwidth used by the UE to send the reference signal.

Optionally, the frequency domain position parameter is obtained using the following formula:

$$n_{b'} = \begin{cases} \lfloor 4n_{RRC}/(m_{SRS,b} \cdot D_h) \rfloor \bmod N_{b'} & b' \leq b_{hop} \\ \{F_b \cdot (n_{SRS}) + \lfloor 4n_{RRC}/(m_{SRS,b} \cdot D_h) \rfloor\} \bmod N_{b'} & \text{otherwise} \end{cases},$$

where $n_{b'}$ is the frequency domain position parameter, $b_{hop}$ is a tree-like structure index of a target frequency hopping bandwidth, b' is a tree-like structure index of a currently-traversed frequency hopping bandwidth, $n_{RRC}$ is a frequency domain position parameter given by a higher layer, $m_{SRS,b}$ is the user-specific SRS bandwidth used by the UE to send the uplink reference signal, $D_h$ is the frequency domain granularity, $F_b(n_{SRS})$ is a frequency domain position offset value of the user, $n_{SRS}$ is a counter used in frequency hopping, $N_{b'}$ is a node quantity of $b'^{th}$-level nodes in a tree-like structure, and the frequency hopping bandwidth is a frequency domain range that exists when frequency-domain frequency hopping of the uplink reference signal is performed.

Further, $F_b(n_{SRS})$ is obtained using the following formula:

$$F_{b'}(n_{SRS}) = \begin{cases} (N_{b'}/2) \left\lfloor \frac{n_{SRS} \bmod \prod_{b''=b_{hop}}^{b'} N_{b''}}{\prod_{b''=b_{hop}}^{b'-1} N_{b''}} \right\rfloor + \left\lfloor \frac{n_{SRS} \bmod \prod_{b''=b_{hop}}^{b'} N_{b''}}{2\prod_{b''=b_{hop}}^{b'-1} N_{b''}} \right\rfloor & \text{if } N_{b'} \text{ is an even number} \\ \lfloor N_{b'}/2 \rfloor \left\lfloor n_{SRS} / \prod_{b''=b_{hop}}^{b'-1} N_{b''} \right\rfloor & \text{if } N_{b'} \text{ is an odd number} \end{cases},$$

where b' is a level number of a node in a tree-like structure of the traversed frequency hopping bandwidth. Further, $n_{SRS}$ may be obtained using the following formula:

$$n_{SRS} = \begin{cases} 2N_{SP}n_f + 2(N_{SP}-1)\left\lfloor \frac{n_s}{10} \right\rfloor + \left\lfloor \frac{T_{offset}}{T_{offset\_max}} \right\rfloor, & \text{for a frame structure type 2 and SRS periodicity of 2 ms} \\ \lfloor (n_f \times 10 + \lfloor n_s/2 \rfloor)/T_{SRS} \rfloor, & \text{otherwise} \end{cases},$$

where $n_{SRS}$ is used to count a quantity of times of transmission performed according to the user-specific SRS bandwidth, and $T_{SRS}$ is SRS transmission periodicity used when periodic SRS transmission is performed. $T_{offset}$ is an SRS transmission subframe offset and used to indicate an SRS transmission time sequence. $T_{offset\_max}$ is a maximum subframe offset for an SRS transmission subframe offset configuration. $n_s$ and $n_f$ are respectively a system timeslot number and a system frame number. $N_{SP}$ is a quantity of downlink-to-uplink switch points within a radio frame.

Optionally, the UE sends the uplink reference signal on a symbol, in each timeslot, for sending a CQI and/or a symbol, in each timeslot, for sending a PMI.

It should be noted that the formula is only one implementation for implementing the frequency hopping performed at intervals. In addition, another method for implementing the frequency hopping performed at intervals is not excluded.

Corresponding to a base station side, FIG. 8 is a schematic flowchart of another uplink reference signal communication method according to an embodiment of the present disclosure. The method is executed by a base station. Further, the base station may be an evolved NodeB, a relay device, a hotspot device, or the like. Referring to FIG. 8, the method includes the following steps.

Step 200: The base station notifies the UE of reference signal bandwidth configuration information for the UE, reference signal frequency hopping interval information for the UE, and a frequency domain position parameter.

The reference signal bandwidth configuration information for the UE indicates a user-specific reference signal bandwidth used by the UE to send an uplink reference signal. The reference signal frequency hopping interval information for the UE indicates a frequency domain granularity of a frequency hopping interval used when frequency-domain frequency hopping of the uplink reference signal is performed. The frequency domain position parameter indicates a frequency domain position that is of the uplink reference signal and is obtained after the UE performs reference signal frequency-domain frequency hopping. The frequency domain granularity is greater than or equal to the user-specific reference signal bandwidth used by the UE to send the reference signal.

Step 201: The base station receives an uplink reference signal sent by the UE.

According to the uplink reference signal communication method provided in this embodiment of the present disclosure, a base station notifies the UE of reference signal bandwidth configuration information for the UE, reference signal frequency hopping interval information for the UE, and a frequency domain position parameter. The reference signal bandwidth configuration information for the UE indicates a user-specific reference signal bandwidth used by the UE to send an uplink reference signal. The reference signal frequency hopping interval information for the UE indicates a frequency domain granularity of a frequency hopping interval used when frequency-domain frequency hopping of the uplink reference signal is performed. The frequency domain position parameter indicates a frequency domain position that is of the uplink reference signal and is obtained after the UE performs reference signal frequency-domain frequency hopping. The frequency domain granularity is greater than or equal to the user-specific reference signal bandwidth used by the UE to send the reference signal. Then, the base station receives the uplink reference signal sent by the UE. Because the reference signal frequency hopping interval information for the UE is added as a parameter when a transmission pattern used by the UE to send the uplink reference signal is determined, the base station performs further sampling when frequency hopping of the uplink reference signal is performed. Therefore, a quantity of measurement times is reduced, and efficiency of channel quality measurement is improved.

Further, in step 200, that the base station notifies reference signal frequency hopping interval information for the UE includes sending, by the base station, a configuration message to the UE, where the configuration message includes the reference signal frequency hopping interval information for the UE, and the configuration message is sent in a manner of higher layer signaling semi-static configuration. Optionally, the configuration message may be sent in a layer-one signaling notification manner.

Optionally, that the frequency domain granularity is greater than or equal to the bandwidth used by the UE to send the reference signal includes that the frequency domain granularity is an integer multiple of the bandwidth used by the UE to send the reference signal.

Optionally, the frequency domain position parameter is obtained using the following formula:

$$n_{b'} = \begin{cases} \lfloor 4n_{RRC}/(m_{SRS,b} \cdot D_h) \rfloor \bmod N_{b'} & b' \le b_{hop} \\ \{F_b \cdot (n_{SRS}) + \lfloor 4n_{RRC}/(m_{SRS,b} \cdot D_h) \rfloor \} \bmod N_{b'} & \text{otherwise} \end{cases},$$

where $n_{b'}$ is the frequency domain position parameter, $b_{hop}$ is a tree-like structure index of a target frequency hopping bandwidth, b' is a tree-like structure index of a currently-traversed frequency hopping bandwidth, $n_{RRC}$ is a frequency domain position parameter given by a higher layer, $m_{SRS,b}$ is the user-specific SRS bandwidth used by the UE to send the uplink reference signal, $D_h$ is the frequency domain granularity of frequency hopping, $F_b(n_{SRS})$ is a frequency domain position offset value of the UE, $n_{SRS}$ is a frequency hopping count value, $N_{b'}$ is a node quantity of $b'^{th}$-level nodes in a tree-like structure, and the frequency hopping bandwidth is a frequency domain range that exists when frequency-domain frequency hopping of the uplink reference signal is performed.

$F_b(n_{SRS})$ is obtained using the following formula:

$$F_{b'}(n_{SRS}) = \begin{cases} (N_{b'}/2) \left\lfloor \dfrac{n_{SRS} \bmod \prod_{b''=b_{hop}}^{b'} N_{b''}}{\prod_{b''=b_{hop}}^{b'-1} N_{b''}} \right\rfloor + \left\lfloor \dfrac{n_{SRS} \bmod \prod_{b''=b_{hop}}^{b'} N_{b''}}{2 \prod_{b''=b_{hop}}^{b'-1} N_{b''}} \right\rfloor \\ \quad \text{if } N_{b'} \text{ is an even number} \\ \lfloor N_{b'}/2 \rfloor \left\lfloor n_{SRS} / \prod_{b''=b_{hop}}^{b'-1} N_{b''} \right\rfloor \\ \quad \text{if } N_{b'} \text{ is an odd number} \end{cases},$$

where b' is a level number of a node in a tree-like structure of the traversed frequency hopping bandwidth.

Further, $n_{SRS}$ may be obtained using the following formula:

$$n_{SRS} = \begin{cases} 2N_{SP}n_f + 2(N_{SP}-1)\left\lfloor \dfrac{n_s}{10} \right\rfloor + \left\lfloor \dfrac{T_{offset}}{T_{offset\_max}} \right\rfloor, & \text{for a frame structure type 2 and SRS periodicity of 2 ms} \\ \lfloor (n_f \times 10 + \lfloor n_s/2 \rfloor)/T_{SRS} \rfloor, & \text{otherwise} \end{cases}$$

where $n_{SRS}$ is used to count a quantity of times of transmission performed according to the user-specific SRS bandwidth, and $T_{SRS}$ is SRS transmission periodicity used when periodic SRS transmission is performed. $T_{offset}$ is an SRS transmission subframe offset and used to indicate an SRS transmission time sequence. $T_{offset\_max}$ is a maximum subframe offset for an SRS transmission subframe offset configuration. $n_s$ and $n_f$ are respectively a system timeslot number and a system frame number. $N_{SP}$ is a quantity of downlink-to-uplink switch points within a radio frame.

Optionally, the base station receives the uplink reference signal on a symbol, in each timeslot, for sending a CQI and/or a symbol, in each timeslot, for sending a PMI.

The following provides description using an example in which the user-specific SRS bandwidth used by the UE to send the uplink reference signal is $1B_{SRS}$, the tree-like structure index corresponding to the frequency hopping bandwidth $b_{hop}$=0 (a frequency domain range of the frequency hopping bandwidth is an entire system bandwidth), and the frequency domain granularity of the frequency hopping interval $D_h=3B_{SRS}$. Because $D_h$ is $3B_{SRS}$, it is equivalent to that frequency hopping is performed using three times the user-specific SRS bandwidth used by the UE to send the uplink reference signal. FIG. 9 is a schematic diagram of a frequency hopping pattern and a frequency domain position obtained after frequency hopping according to this embodiment of the present disclosure. Referring to FIG. 9, a bandwidth for transmitting an SRS by a user each time is $1B_{SRS}$, and $D_h$ in which the UE performs frequency hopping is $3B_{SRS}$.

Optionally, the UE sends the uplink reference signal on the symbol, in each timeslot, for sending a CQI and/or the symbol, in each timeslot, for sending a PMI.

For the embodiments shown in FIG. 6 to FIG. 8, an example in which the uplink reference signal is an SRS, and an uplink system bandwidth is greater than 40 and is less than or equal to 60 is used. User-specific SRS bandwidths and corresponding $N_b$ values for eight cell-specific SRS bandwidth configurations corresponding to the SRS are shown in Table 2 in the following:

TABLE 2

| SRS bandwidth configuration | SRS-bandwidth $B_{SRS}=0$ | | SRS-bandwidth $B_{SRS}=1$ | | SRS-bandwidth $B_{SRS}=2$ | | SRS-bandwidth $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

Referring to Table 2, $C_{SRS}$ is an index number of a cell-specific SRS bandwidth configuration, and $B_{srs}$ is an index of a user-specific SRS bandwidth configuration.

The frequency hopping interval in the solution may be semi-statically notified to the user using higher layer signaling, that is, a user-specific frequency domain granularity of the frequency hopping interval is configured using the higher layer signaling. A unit of the frequency domain granularity may be $m_{SRS,b}$ in the foregoing. The UE performs corresponding frequency-domain frequency hopping according to the frequency domain granularity.

To implement flexible and quick full-bandwidth channel quality measurement, an embodiment of the present disclosure provides another feasible manner A maximum user-specific SRS bandwidth is set for each uplink system bandwidth. That is, different maximum measurable SRS bandwidths are set for different users in each cell. Referring to Table 2, that is, the cell-specific parameter $C_{SRS}$ is extended to configuration information of a maximum measurable reference signal bandwidth for the UE. Alternatively, configuration information of a maximum measurable reference signal bandwidth for the UE is further set for the cell-specific parameter $C_{SRS}$. For example, compared with a cell-center user, a cell-edge user may have configuration information of a smaller maximum measurable reference signal bandwidth. Therefore, an uplink channel quality measurement time can be greatly reduced when the system bandwidth is relatively large.

The following describes the feasible manner. FIG. 10 is a schematic flowchart of another uplink reference signal communication method according to an embodiment of the present disclosure. The method is executed by UE. Further, the UE may be an intelligent terminal, such as a smartphone, a tablet, or a wearable intelligent device. Referring to FIG. 10, the method includes the following step.

Step 301: The UE transmits an uplink reference signal of the UE according to reference signal bandwidth configuration information for the UE, configuration information of a maximum reference signal frequency hopping bandwidth for the UE, and a frequency domain position parameter.

The reference signal bandwidth configuration information for the UE indicates a user-specific reference signal bandwidth used by the UE to send the uplink reference signal. The configuration information of a maximum reference signal frequency hopping bandwidth for the UE indicates a maximum frequency hopping bandwidth that is of the uplink reference signal and that can be supported by the UE. The frequency domain position parameter indicates a frequency domain position that is of the uplink reference signal and is obtained after the UE performs reference signal frequency-domain frequency hopping.

According to the uplink reference signal communication method provided in this embodiment of the present disclosure, UE transmits an uplink reference signal of the UE according to reference signal bandwidth configuration information for the UE, configuration information of a maximum reference signal frequency hopping bandwidth for the UE, and a frequency domain position parameter. The reference signal bandwidth configuration information for the UE indicates a user-specific reference signal bandwidth used by the UE to send the uplink reference signal. The configuration information of a maximum reference signal frequency hopping bandwidth for the UE indicates a maximum frequency hopping bandwidth that is of the uplink reference signal and that can be supported by the UE. The frequency domain position parameter indicates a frequency domain position that is of the uplink reference signal and is obtained after the UE performs reference signal frequency-domain frequency hopping. Because the configuration information of a maximum reference signal frequency hopping bandwidth for the UE is set, a maximum value of a reference signal bandwidth that can be used by the UE is limited. Therefore, for some specific UEs such as a cell-edge UE, configuration information of a relatively small maximum reference signal frequency hopping bandwidth may be allocated to the UE to reduce an uplink channel quality measurement time when a system bandwidth is relatively large in order to improve efficiency of channel quality measurement.

Optionally, based on FIG. 10, FIG. 11 is a schematic flowchart of another uplink reference signal communication method according to an embodiment of the present disclosure. Referring to FIG. 11, before step 301, the method further includes the following step.

Step 300: The UE receives a configuration message sent by a base station, where the configuration message includes the configuration information of a maximum reference signal frequency hopping bandwidth for the UE.

The configuration information of a maximum reference signal frequency hopping bandwidth for the UE is configured in a manner of higher layer signaling semi-static configuration. Optionally, the reference signal frequency hopping interval information for the UE may be configured using layer-one signaling.

Further, the configuration information of a maximum reference signal frequency hopping bandwidth for the UE is configured by the base station and delivered by the base station to the UE. For each UE, the base station separately configures corresponding configuration information of a maximum reference signal frequency hopping bandwidth. Therefore, configuration information of a maximum reference signal frequency hopping bandwidth for UEs may be different, or may be the same. A specific configuration is configured by the base station according to a specific environment, and is not limited herein.

Optionally, the method further includes that the cell-specific reference signal bandwidth configuration information has a correspondence with the configuration information of a maximum reference signal frequency hopping bandwidth for the UE.

The UE determines the configuration information of a maximum reference signal frequency hopping bandwidth for the UE according to the cell-specific reference signal bandwidth configuration information.

Optionally, the UE sends the uplink reference signal on a symbol, in each timeslot, for sending a CQI and/or a symbol, in each timeslot, for sending a PMI.

Figure 12:
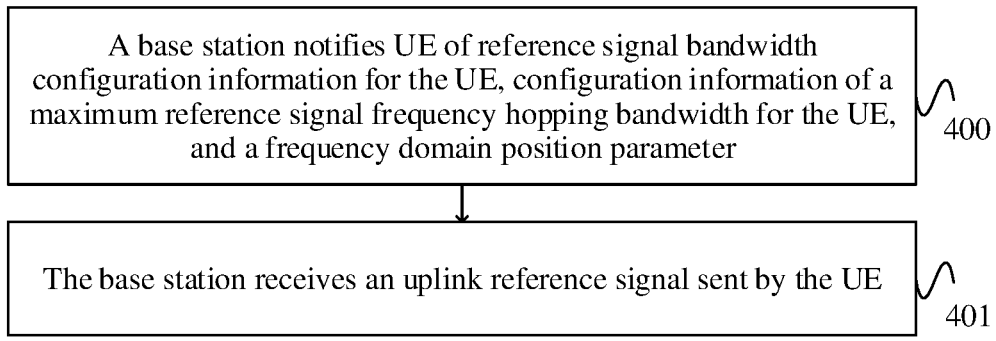
FIG. 12 is a schematic flowchart of another uplink reference signal communication method according to an embodiment of the present disclosure.

Corresponding to a base station side, FIG. 12 is a schematic flowchart of another uplink reference signal communication method according to an embodiment of the present disclosure. The method is executed by a base station. Further, the base station may be an evolved NodeB, a relay device, a hotspot device, or the like. Referring to FIG. 12, the method includes the following steps:

Step 400: The base station notifies the UE of reference signal bandwidth configuration information for the UE, configuration information of a maximum reference signal frequency hopping bandwidth for the UE, and a frequency domain position parameter.

The reference signal bandwidth configuration information for the UE indicates a user-specific reference signal bandwidth used by the UE to send an uplink reference signal. The configuration information of a maximum reference signal frequency hopping bandwidth for the UE indicates a maximum frequency hopping bandwidth that is of the uplink reference signal and that can be supported by the UE. The frequency domain position parameter indicates a frequency domain position that is of the uplink reference signal and is obtained after the UE performs reference signal frequency-domain frequency hopping.

Step 401: The base station receives an uplink reference signal sent by the UE.

According to the uplink reference signal communication method provided in this embodiment of the present disclosure, a base station notifies the UE of reference signal bandwidth configuration information for the UE, configuration information of a maximum reference signal frequency hopping bandwidth for the UE, and a frequency domain position parameter. The reference signal bandwidth configuration information for the UE indicates a user-specific reference signal bandwidth used by the UE to send an uplink reference signal. The configuration information of a maximum reference signal frequency hopping bandwidth for the UE indicates a maximum frequency hopping bandwidth that is of the uplink reference signal and that can be supported by the UE. The frequency domain position parameter indicates a frequency domain position that is of the uplink reference signal and is obtained after the UE performs reference signal frequency-domain frequency hopping. Then, the base station receives the uplink reference signal sent by the UE. Because the configuration information of a maximum reference signal frequency hopping bandwidth for the UE is set, a maximum value of a reference signal bandwidth that can be used by the UE is limited. Therefore, for some specific UEs such as a cell-edge UE, configuration information of a relatively small maximum reference signal frequency hopping bandwidth may be allocated to the UE to reduce an uplink channel quality measurement time when a system bandwidth is relatively large in order to improve efficiency of channel quality measurement.

Optionally, in step 400, that the base station notifies configuration information of a maximum reference signal frequency hopping bandwidth for the UE includes sending, by the base station, a configuration message to the UE, where the configuration message includes the configuration information of a maximum reference signal frequency hopping bandwidth for the UE, and the configuration message is sent in a manner of higher layer signaling semi-static configuration. Optionally, the configuration message may be sent in a layer-one signaling notification manner.

Optionally, the configuration message further includes cell-specific reference signal bandwidth configuration information.

The cell-specific reference signal bandwidth configuration information has a correspondence with the configuration information of a maximum reference signal frequency hopping bandwidth for the UE such that the UE determines the configuration information of a maximum reference signal frequency hopping bandwidth for the UE according to the cell-specific reference signal bandwidth configuration information.

Optionally, the base station receives the uplink reference signal on a symbol, in each timeslot, for sending a CQI and/or a symbol, in each timeslot, for sending a PMI.

Further, an SRS is used as an example. A maximum user-specific SRS bandwidth $U_{SRS}$ may be set for each uplink system bandwidth. For example, the uplink system bandwidth is greater than 40 and is less than or equal to 60. In this case, configurations of eight maximum user-specific SRS bandwidths corresponding to the SRS, and user-specific SRS bandwidths and $N_b$ values for the corresponding configurations are shown in the following table.

| User-specific SRS bandwidth setting $U_{SRS}$ | SRS-bandwidth $B_{SRS}=0$ | | SRS-bandwidth $B_{SRS}=1$ | | SRS-bandwidth $B_{SRS}=2$ | | SRS-bandwidth $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

A cell-specific SRS bandwidth configuration for another uplink system bandwidth may be similarly extended to a configuration of a maximum user-specific SRS bandwidth. Alternatively, there may be further a configuration of a maximum user-specific SRS bandwidth $U_{SRS}$ for each cell-specific SRS bandwidth configuration. Likewise, for example, the uplink system bandwidth is greater than 40 and is less than or equal to 60. In this case, configurations of maximum user-specific SRS bandwidths for cell-specific SRS bandwidth configurations corresponding to the SRS, and user-specific SRS bandwidth values for the corresponding configurations are shown in the following table

| Cell-specific SRS bandwidth configuration $C_{SRS}$ | User-specific SRS bandwidth configuration $U_{SRS,0}$ | User-specific SRS bandwidth configuration $U_{SRS,1}$ | User-specific SRS bandwidth configuration $U_{SRS,2}$ | User-specific SRS bandwidth configuration $U_{SRS,3}$ | User-specific SRS bandwidth configuration $U_{SRS,4}$ | User-specific SRS bandwidth configuration $U_{SRS,5}$ | User-specific SRS bandwidth configuration $U_{SRS,6}$ |
|---|---|---|---|---|---|---|---|
| 0 | 48 | 40 | 36 | 32 | 24 | 20 | 16 |
| 1 | 40 | 36 | 32 | 24 | 20 | 16 | 12 |
| 2 | 36 | 32 | 24 | 20 | 16 | 12 | 8 |
| 3 | 32 | 24 | 20 | 16 | 12 | 8 | 4 |
| 4 | 24 | 20 | 16 | 12 | 8 | 4 | — |
| 5 | 20 | 16 | 12 | 8 | 4 | — | — |
| 6 | 16 | 12 | 8 | 4 | — | — | — |

$U_{SRS,b}$ in the table represents several configurations of maximum user-specific SRS bandwidths. $C_{SRS}$ is several cell-specific SRS bandwidth settings. For each cell-specific SRS bandwidth setting, there are several settings of maximum user-specific SRS bandwidths. For example, for $C_{SRS}=0$, there are seven maximum user-specific SRS bandwidths such as $U_{SRS,b}=48, 40, 36, 32, 24, 20, 16$.

Likewise, the settings of maximum user-specific SRS bandwidths may be notified to and configured for a user using higher layer signaling.

In the SRS transmission solutions in the foregoing embodiments, SRS transmission is enhanced in a frequency domain. In a high frequency TDD scenario, performing channel quality measurement according to reciprocity of uplink and downlink channels will be a mainstream and mandatory solution. In this case, precision of performing channel quality measurement using an SRS needs to be further enhanced. To improve the precision of SRS channel quality measurement, the SRS transmission may be further enhanced in a time domain. For example, the SRS is simultaneously transmitted on symbols, in each timeslot, used for transmitting a PMI and a CQI, and different antennas are selected to perform sending on multiple symbols for transmitting the SRS. Therefore, more precise spatial channel information can be provided when TDD reciprocity is used.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A base station, comprising:
a transmitter configured to notify a user equipment (UE) of reference signal bandwidth configuration information Bsrs for the UE, configuration information of a maximum reference signal frequency hopping bandwidth $C_{SRS}$ for the UE, and a frequency domain position parameter $n_{RRC}$, wherein the reference signal bandwidth configuration information Bsrs for the UE is used to determine a user-specific reference signal bandwidth used by the UE to send a sounding reference signal (SRS), wherein the configuration information of the maximum reference signal frequency hopping bandwidth $C_{SRS}$ for the UE comprises UE-specific configuration information indicating a maximum measurable SRS bandwidth, wherein a value of the $C_{SRS}$ for a channel quality or for a signal strength is less than a second value of the $C_{SRS}$ for a second channel quality or for a second signal strength, wherein the channel quality is less than the second channel quality, wherein the signal strength is less than the second signal strength, and wherein the frequency domain position parameter $n_{RRC}$ is used to determine a frequency domain position of the SRS obtained after the UE performs reference signal frequency-domain frequency hopping; and
a receiver coupled to the transmitter and configured to receive the SRS from the UE.

2. The base station according to claim 1, wherein the transmitter is further configured to send a configuration message to the UE, wherein the configuration message comprises the configuration information of the maximum reference signal frequency hopping bandwidth $C_{SRS}$ for the UE, and wherein the configuration message is sent in a manner of higher layer signaling semi-static configuration.

3. The base station according to claim 1, wherein the transmitter is further configured to receive the SRS on a symbol, in each timeslot, for sending a channel quality indicator (CQI) and a symbol, in each timeslot, for sending a precoding matrix indicator (PMI).

4. The base station according to claim 1, wherein the transmitter is further configured to receive the SRS on a symbol, in each timeslot, for sending a channel quality indicator (CQI).

5. The base station according to claim 1, wherein the transmitter is further configured to receive the SRS on a symbol, in each timeslot, for sending a precoding matrix indicator (PMI).

6. The base station according to claim 1, wherein different antennas are selected to perform transmissions on multiple symbols for transmitting the SRS.

7. An uplink reference signal receiving method, comprising:
notifying, by a base station, a user equipment (UE) of reference signal bandwidth configuration information Bsrs for the UE, configuration information of a maximum reference signal frequency hopping bandwidth $C_{SRS}$ for the UE, and a frequency domain position parameter $n_{RRC}$, wherein the reference signal bandwidth configuration information Bsrs for the UE is used to determine a user-specific reference signal bandwidth used by the UE to send a sounding reference signal (SRS), wherein the configuration information of the maximum reference signal frequency hopping bandwidth $C_{SRS}$ for the UE comprises UE-specific configuration information indicating a maximum measurable SRS bandwidth, wherein a value of the $C_{SRS}$ for a channel quality or for a signal strength is less than a second value of the $C_{SRS}$ for a second channel quality or for a second signal strength, wherein the channel quality is less than the second channel quality, wherein the signal strength is less than the second signal strength, and wherein the frequency domain position parameter $n_{RRC}$ is used to determine a frequency domain position of the SRS obtained after the UE performs reference signal frequency-domain frequency hopping; and receiving, by the base station, the SRS from the UE.

8. The method according to claim 7, wherein notifying the configuration information of the maximum reference signal frequency hopping bandwidth $C_{SRS}$ for the UE comprises sending, by the base station, a configuration message to the UE, wherein the configuration message comprises the configuration information of the maximum reference signal frequency hopping bandwidth $C_{SRS}$ for the UE, and wherein the configuration message is sent in a manner of higher layer signaling semi-static configuration.

9. The method according to claim 7, further comprising receiving, by the base station, the SRS on one of a symbol, in each timeslot, for sending a channel quality indicator (CQI) or a symbol, in each timeslot, for sending a precoding matrix indicator (PMI).

10. The method according to claim 7, wherein different antennas are selected to perform transmissions on multiple symbols for transmitting the SRS.

11. The method according to claim 7, wherein receiving, by the base station, the SRS from the UE comprises receiving the SRS on a symbol, in each timeslot, for sending a channel quality indicator (CQI).

12. The method according to claim 7, wherein receiving, by the base station, the SRS from the UE comprises receiving the SRS on a symbol, in each timeslot, for sending a precoding matrix indicator (PMI).

13. A non-transitory computer readable storage medium storing program, wherein the program comprises instructions executable by a processor for implementing a method, the method comprising:

notifying, a user equipment (UE) of reference signal bandwidth configuration information Bsrs for the UE, configuration information of a maximum reference signal frequency hopping bandwidth $C_{SRS}$ for the UE, and a frequency domain position parameter $n_{RRC}$, wherein the reference signal bandwidth configuration information Bsrs for the UE is used to determine a user-specific reference signal bandwidth used by the UE to send a sounding reference signal (SRS), wherein the configuration information of the maximum reference signal frequency hopping bandwidth $C_{SRS}$ for the UE comprises UE-specific configuration information indicating a maximum measurable SRS bandwidth, wherein a value of the $C_{SRS}$ for a channel quality or for a signal strength is less than a second value of the $C_{SRS}$ for a second channel quality or for a second signal strength, wherein the channel quality is less than the second channel quality, wherein the signal strength is less than the second signal strength, and wherein the frequency domain position parameter $n_{RRC}$ is used to determine a frequency domain position of the SRS obtained after the UE performs reference signal frequency-domain frequency hopping; and receiving the SRS from the UE.

14. The non-transitory computer readable storage medium according to claim 13, wherein notifying the configuration information of the maximum reference signal frequency hopping bandwidth $C_{SRS}$ for the UE comprises sending a configuration message to the UE, wherein the configuration message comprises the configuration information of the maximum reference signal frequency hopping bandwidth $C_{SRS}$ for the UE, and wherein the configuration message is sent in a manner of higher layer signaling semi-static configuration.

15. The non-transitory computer readable storage medium according to claim 13, further comprising receiving the SRS on one of:

a symbol, in each timeslot, for sending a channel quality indicator (CQI); or a symbol, in each timeslot, for sending a precoding matrix indicator (PMI).

16. The non-transitory computer readable storage medium according to claim 13, wherein receiving the SRS from the UE comprises receiving the SRS on a symbol, in each timeslot, for sending a channel quality indicator (CQI).

17. The non-transitory computer readable storage medium according to claim 13, wherein receiving the SRS from the UE comprises receiving the SRS on a symbol, in each timeslot, for sending a precoding matrix indicator (PMI).

18. The non-transitory computer readable storage medium according to claim 13, wherein different antennas are selected to perform transmissions on multiple symbols for transmitting the SRS.

* * * * *